(12) United States Patent
Tanaka et al.

(10) Patent No.: US 7,113,927 B1
(45) Date of Patent: Sep. 26, 2006

(54) DATA DISTRIBUTION SYSTEM, DATA DISTRIBUTION METHOD, PORTABLE TERMINAL WITH DATA RECEIVING CAPABILITY, PORTABLE TERMINAL WITH DATA TRANSMITTING/RECEIVING CAPABILITY, RECORDING MEDIUM ONTO WHICH DATA CONTENT IS RECORDED, ENCODING APPARATUS, AND DECODING APPARATUS

(75) Inventors: Yoshiaki Tanaka, Kanagawa-ken (JP); Tomohiro Mouri, Tokyo (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/413,651

(22) Filed: Oct. 6, 1999

(30) Foreign Application Priority Data

| Oct. 9, 1998 | (JP) | ................................. P10-288487 |
|---|---|---|
| Dec. 4, 1998 | (JP) | ................................. P10-345938 |
| Sep. 21, 1999 | (JP) | ................................. P11-267575 |
| Sep. 21, 1999 | (JP) | ................................. P11-267618 |

(51) Int. Cl.
*G06F 17/40* (2006.01)

(52) U.S. Cl. ........................ 705/56; 707/10; 380/4; 705/1; 705/59; 705/58; 705/57; 705/55

(58) Field of Classification Search .................. 707/10; 380/4; 705/1, 50–59
See application file for complete search history.

(56) References Cited

U.S. PATENT DOCUMENTS

| 5,646,992 | A | * | 7/1997 | Subler et al. .................. 705/53 |
|---|---|---|---|---|
| 5,826,270 | A | * | 10/1998 | Rutkowski et al. ............ 707/10 |
| 6,226,618 | B1 | * | 5/2001 | Downs et al. .................. 705/1 |
| 6,259,891 | B1 | * | 7/2001 | Allen ........................ 455/3.02 |
| 2002/0158130 | A1 | * | 10/2002 | Pellaumail et al. .... 235/462.13 |

FOREIGN PATENT DOCUMENTS

| AU | WO 03/088094 A1 | * | 10/2003 |
|---|---|---|---|
| JP | 7143081 | | 6/1995 |
| JP | 7147063 | | 6/1995 |
| JP | 08-223171 | | 8/1996 |
| JP | 9146820 | | 6/1997 |
| JP | 10116472 | | 5/1998 |
| JP | 10163991 | | 6/1998 |
| JP | 10-269289 | | 10/1998 |

OTHER PUBLICATIONS

Networking leaves home as IBM, Motorola launch "mobile computing." (Saunier, Frederic; Marketing Computers, v10, n4, p42(Apr. 1, 1990).*

Switched access network architecture (Berkowitz, Paul; Telecommunications(Americas Edition) v32n5 pp64–65, May 1998).*

"1999 August Nikkei Net Business", *Nikkei BP Corp.*, p. 71 (1999).

* cited by examiner

*Primary Examiner*—James P. Trammell
*Assistant Examiner*—Cristina Sherr
(74) *Attorney, Agent, or Firm*—Nath & Associates PLLC; Gregory B. Kang; Derek Richmond

(57) ABSTRACT

A data distribution system has a portable user terminal, which sends a portable terminal ID or memory card ID and electronic money are sent to a store-based terminal (10) and receives data content, a store-based terminal (11), which receives the portable terminal ID or memory card ID and electronic money from the portable user terminal (10), and which sends these to a billing center (12), along with a content ID and a store-based terminal ID, a billing center (12) that receives the content ID, the portable terminal ID or memory card ID, the store-based terminal ID, and the electronic money from the store-based terminal (11), and a content center (13), which receives the content ID, the portable terminal ID or memory card ID, and the store-based terminal ID, and which distributes data content, via the store-based terminal (11), to the portable terminal (10).

18 Claims, 25 Drawing Sheets

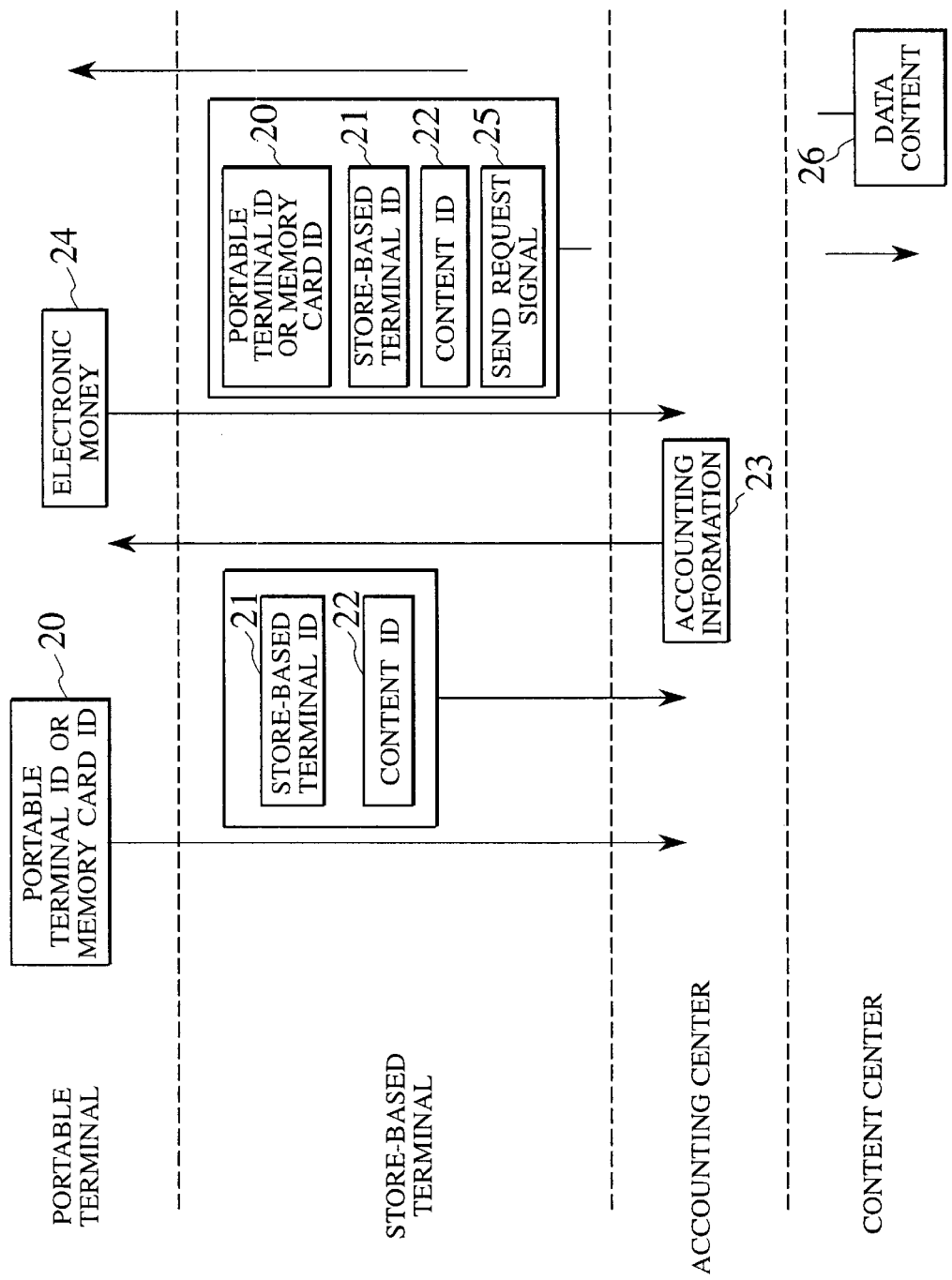

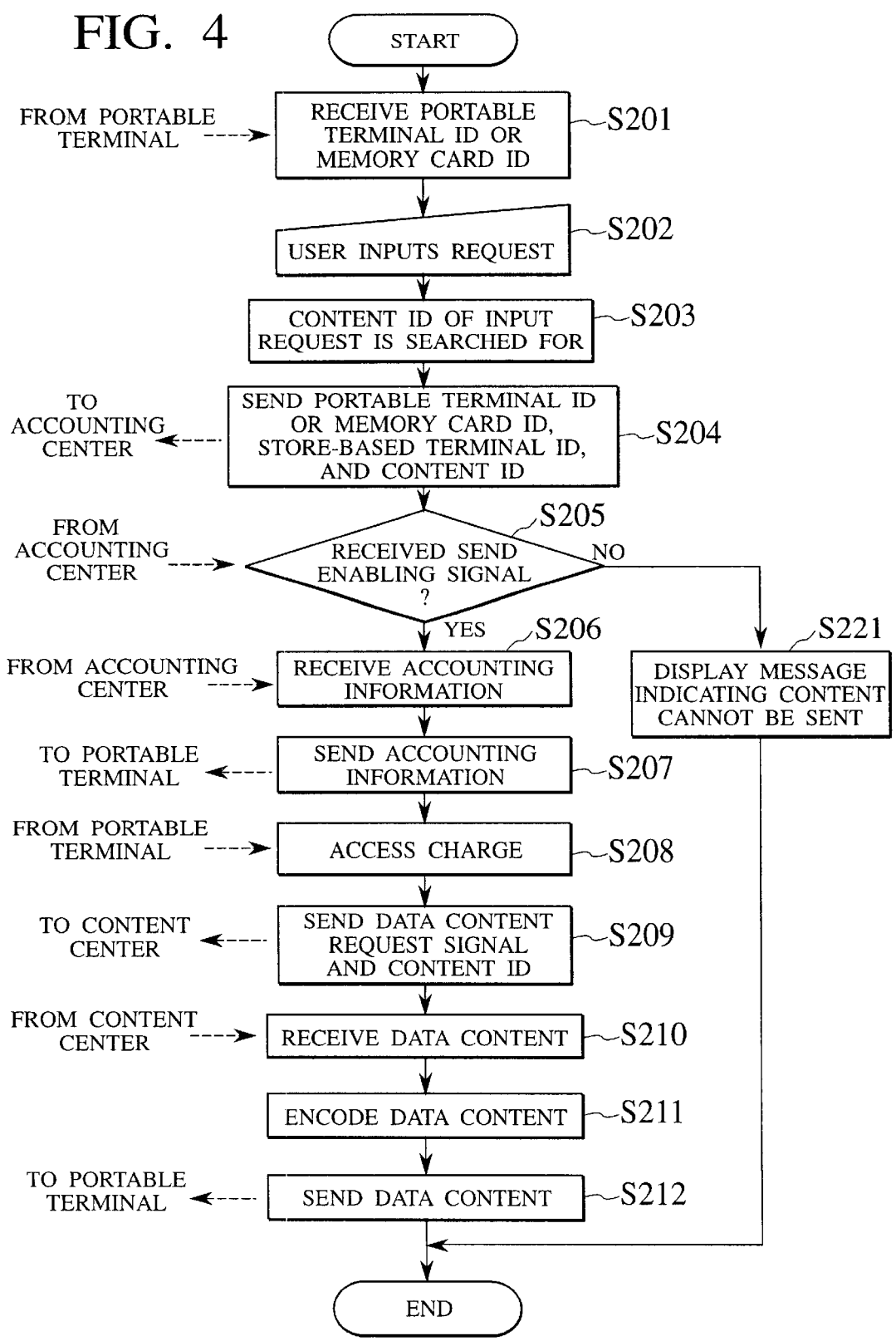

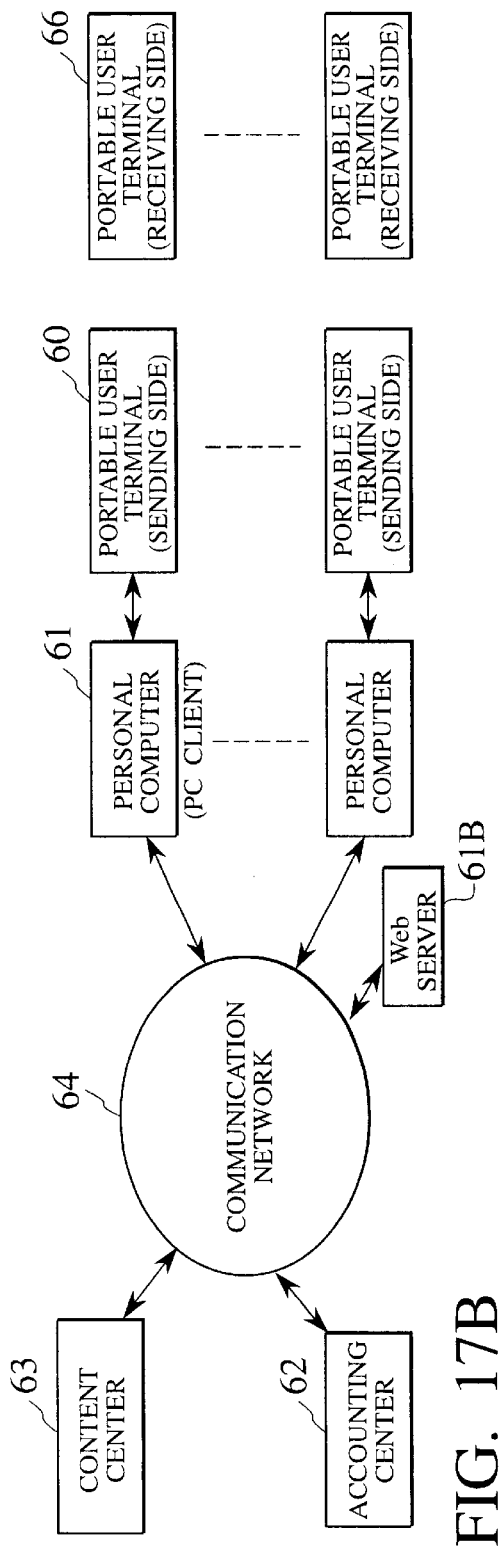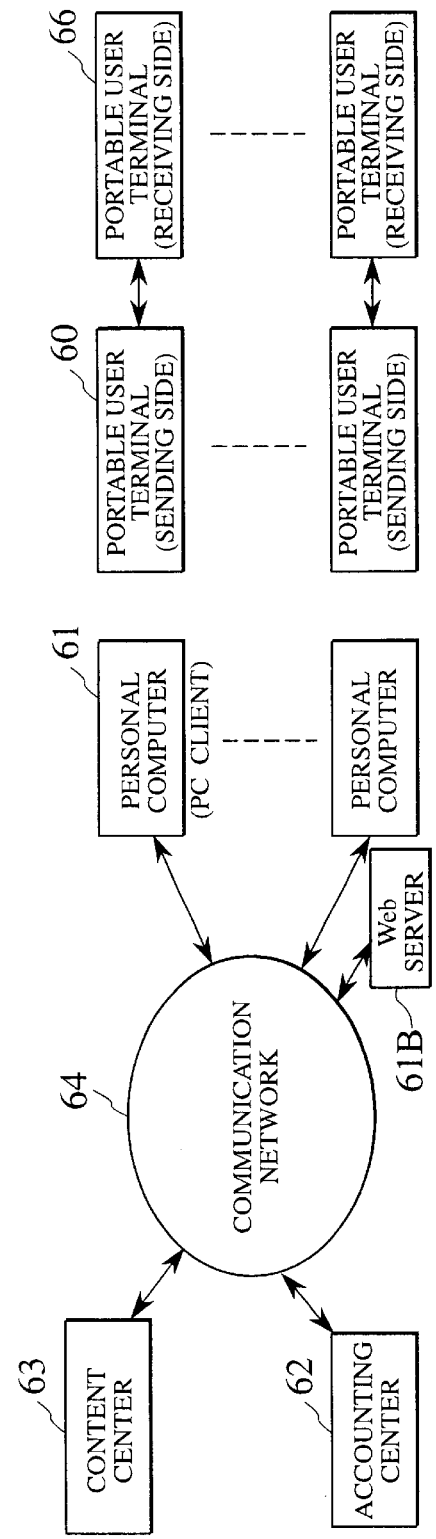

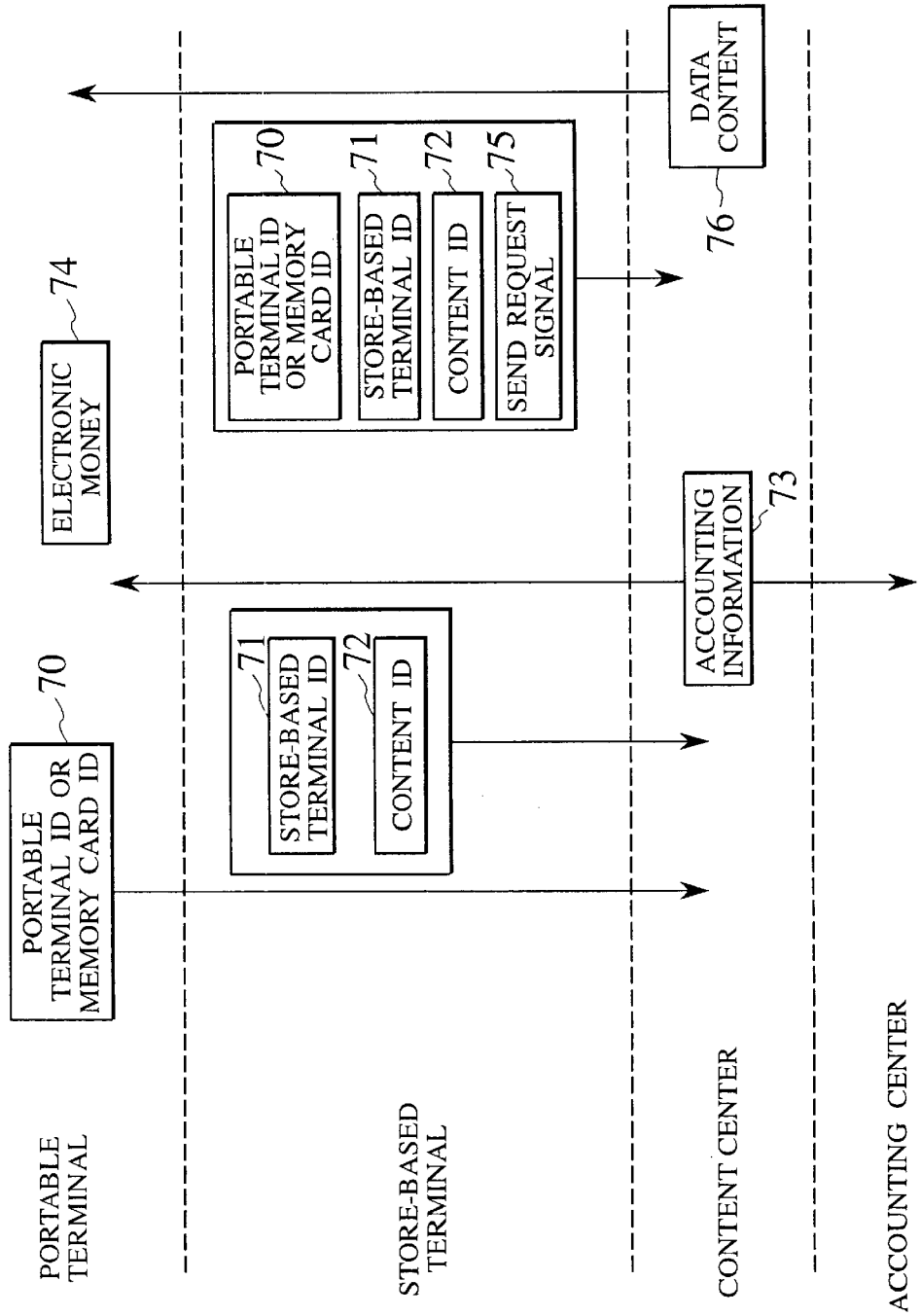

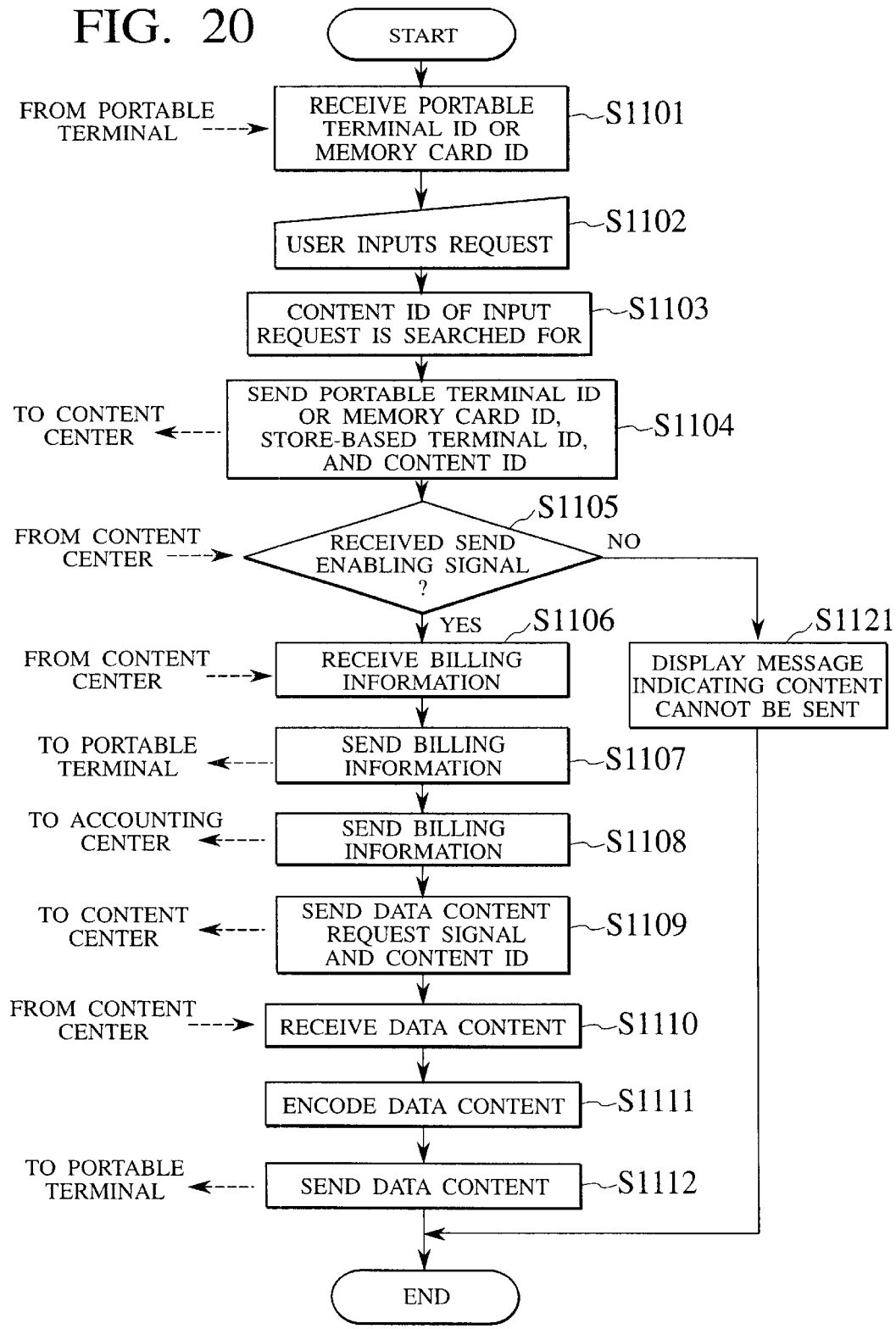

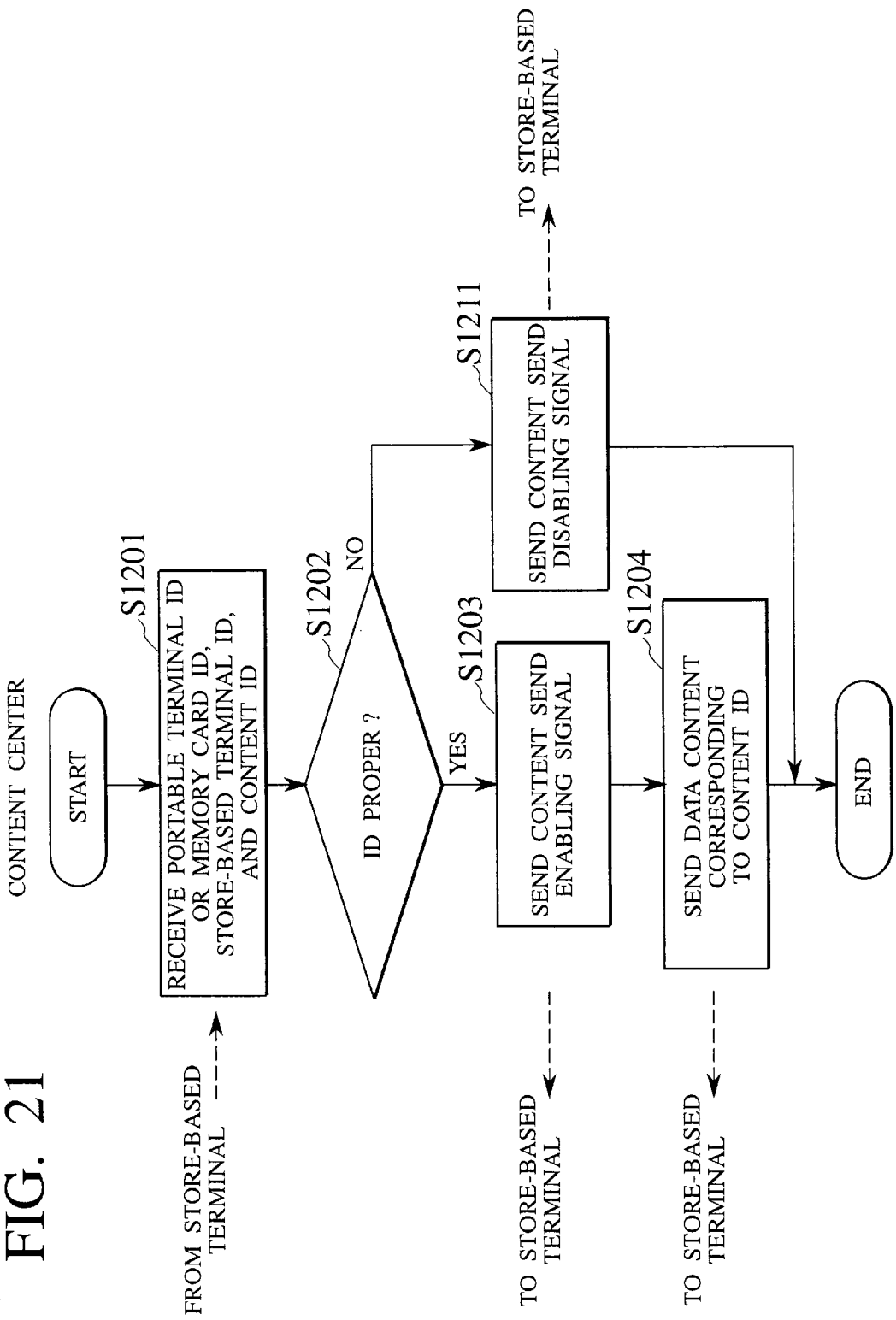

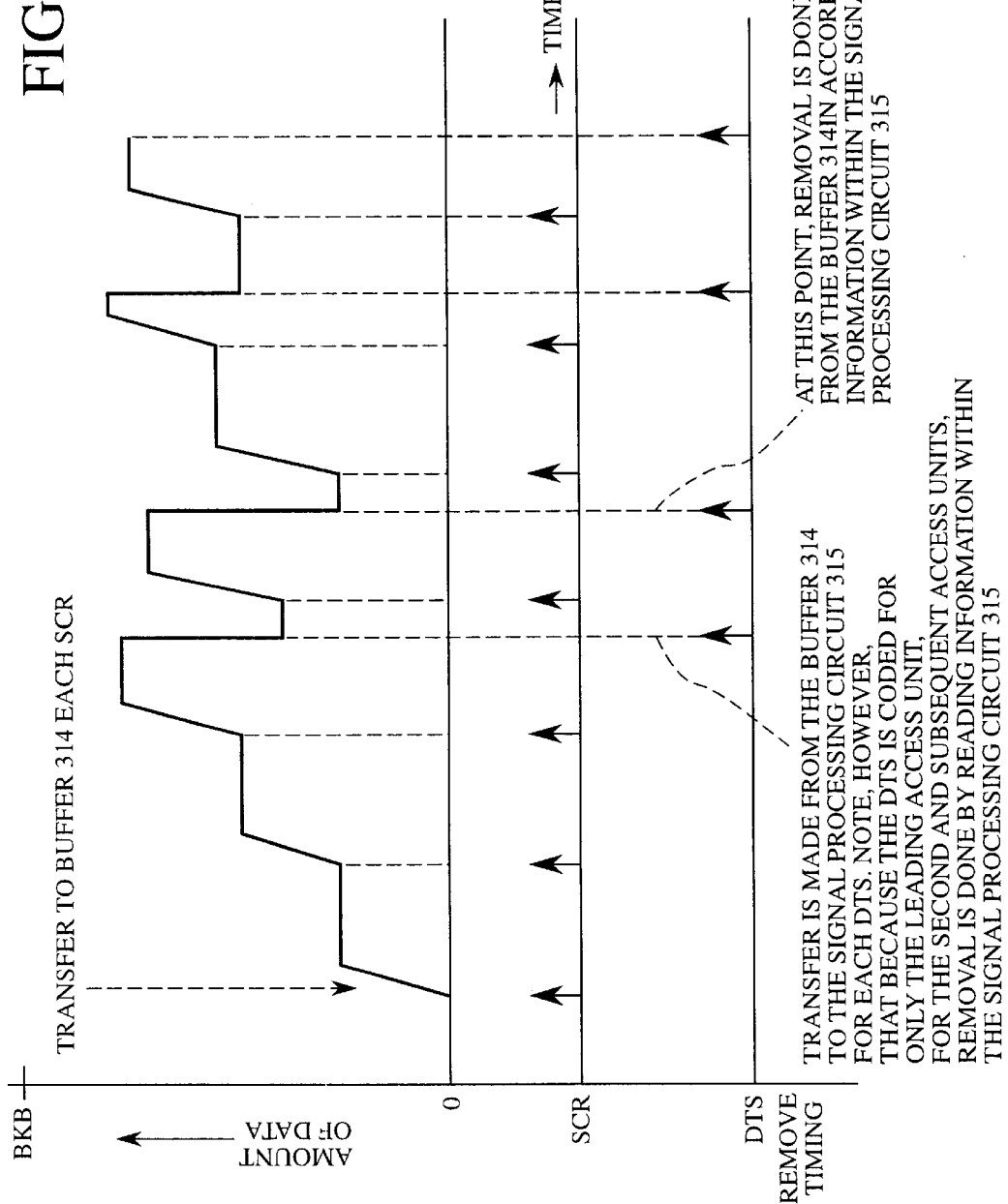

DATA DISTRIBUTION SYSTEM, DATA DISTRIBUTION METHOD, PORTABLE TERMINAL WITH DATA RECEIVING CAPABILITY, PORTABLE TERMINAL WITH DATA TRANSMITTING/RECEIVING CAPABILITY, RECORDING MEDIUM ONTO WHICH DATA CONTENT IS RECORDED, ENCODING APPARATUS, AND DECODING APPARATUS

BACKGROUND OF THE INVENTION

1. Field of the Invention

The present invention relates to a data distribution system, to a data distribution method, to a portable terminal capable of data reception and to a portable terminal capable of data transmission. It also relates to a recording medium onto which data content is recorded, and more particularly to a recording medium onto which are recorded data content that is scrambled differently, depending upon the transmission destination.

2. Description of the Related Art

In the past, there have been disclosures of a system for distributing such data as music data, using a communication circuit (for example, in the Japanese Laid-Open Patent Application publications H7-147063 and H9-146820), and a system for distribution of such data via a communications satellite (for example in the Japanese Laid-Open Patent Application publications H7-143081 and H10-163991).

At present, even with tastes in music diversifying, and fashions in music changing significantly in a short period of time, a content center can select the desired song from among its huge amount of stored data content, thereby making it possible to use an extremely large number of songs, and to quickly meet the diversifying tastes of consumers and quick changes in popularity.

In a data distribution system, a data distribution method, and a data playback system of the past, however, it was not easy to receive a small amount of money each time data was distributed with a low cost. Additionally, when data was sold at in a store, it was not easy to achieve a quick and accurate understanding of the demographics of the users (such as age and gender). In the case in which an existing medium such as Minidisc™ (MD) was used to stored data, it was not possible to charge a user for copies made and distributed between users via this medium. With the widespread utilization of such networks as the Internet, while it is possible to access music content from all over the world, from either a store or at home, there had not been a specific proposal for a network-ready terminal (audio equipment) that could be conveniently used to carry that music content around.

While a typical example of digital content is music data, such digital content also encompasses static images, moving images, document dada, game programs, and application software.

Because such digital data can be quickly and accurately copied, there is a great need to protect such data from illegal copying. With large amounts of diverse data being distributed, there is an increasing need for a fast data transmission and fast data playback.

SUMMARY OF THE INVENTION

The object of the present invention is to reduce the cost of credit management, preventing data contents from being illegally copied, and serving the diversified tastes of users.

Another object of the present invention is to prevent data contents from being illegally copied, achieving highly efficient data compression and transmission.

To achieve the above-noted object, The first aspect of the present invention is a data distribution system that has a portable user terminal, which sends a portable terminal ID (identification) and electronic money to a store-based terminal and receives data content, a store-based terminal, which receives a portable terminal ID and electronic money from the portable user terminal and sends these to a billing center, and which also sends a content ID and a store-based terminal ID to the billing center, a billing center, which receives the content ID, the portable terminal ID, the store-based terminal ID and the electronic money from the stored-based terminal, and a content center, is which receives the portable terminal ID and store-based terminal ID, and which sends the data content, via the store-based terminal, to the portable user terminal.

The data content that is stored in the portable terminal is preferably encoded by means of the portable terminal ID, and it is preferable that the billing center make a judgment as the properness of the portable terminal ID and the store-based terminal ID.

The second aspect of the present invention is a data distribution method that has a step of sending a portable terminal ID from a portable terminal to a store-based terminal, a step of sending the portable terminal ID, a content ID, and a store-based terminal ID from the portable terminal to a billing center, a step of sending billing information corresponding to the content ID to the portable terminal from the billing center, via the store-based terminal, a step of sending electronic money corresponding to the above-noted billing information from the portable terminal, via the store-based terminal, to the billing center, a step of sending a send request signal for the data content that corresponds to the above-noted content ID from the store-based terminal to the above-noted content center, and a step of distributing the data content from the content center, via the store-based terminal, to the portable terminal.

The third aspect of the present invention is a portable terminal with receiving capability, this terminal having a control section, which performs overall operational control, a data transmission interface, which performs transfer of data with the outside, a storage section, which performs writing and reading of data, a data expansion section, which expands compressed data, a decoding section, which decodes encoded data, a playback section, which plays back data, an electronic wallet section, which performs receipt and payment of electronic money, and an internal bus, which performs data transfer between the control section, the interface, the storage section, the data extension section, the decoding section, the playback section, and the electronic wallet section, wherein the electronic wallet section pays a charge for the above-noted data, this data decoded and compressed and stored in the storage section, this encoded, compressed data being expanded by the data expansion section, decoded by the decoding section, and played back by the playback section.

The fourth aspect of the present invention is a data distribution system that has a first portable terminal, which sends a content ID, a first portable terminal ID, and electronic money, and which receives data content that corresponds to the sent content ID, a second portable terminal, which distributes the data content to the first portable terminal and also sends not only the content ID, the first portable terminal ID and electronic money, but also the second portable terminal ID to a store-based terminal, a store-based terminal, which sends not only the content ID, the first portable terminal ID, the second portable terminal ID and electronic money, but also the store-based terminal ID to a billing center, and a billing center, which receives the content ID, the first portable terminal ID, the second portable terminal ID, the store-based terminal ID, and electronic money.

In the above-noted second portable terminal, the data content is encoded according to the second portable terminal ID and stored, this encoded content being decoded according to the second portable terminal ID, after which the content is then encoded with the first portable terminal ID, and then sent from the second portable terminal to the first portable terminal.

According to the present invention, because payment is made by means of electronic money or by a prepaid method, it is possible to reduce the cost of credit management, even for small payments.

The data content is encoded with an encryption key that is different for each portable terminal or memory card and stored within the portable terminal, so that even if it is illegally copied, it cannot be easily played back at a different portable terminal, thereby providing protection against illegal copying.

Additionally, it is possible for a user to select arbitrary data content from the large amount of data content that is stored in a content center, thereby adequately serving the diversified tastes of users.

Because the location of a store-based terminal can be ascertained from the terminal ID, it is easy to generate a hit chart organized by geographical region. Because the personal terminal ID provides demographic information such as age and gender, it is further easy to generated a hit chart organized by age and gender, making the present invention a tool for use in obtaining detail market information.

Additionally, in contrast to copyright protection technology of the past, with the present invention, even if data transfer is permitted between users, by imposing a charge at the time of data transfer, it is possible to reimburse the copyright holder for the usage.

It is also possible to determine, from the data content, such information as whether purchases from a store-based terminal or from a portable terminal are more common, thereby providing more detailed market information.

Because copying is possible from a portable terminal, without the intervention of a store-based terminal, the locations at which data can be copied, that is, at which data can be sold, are greatly expanded. For this reason, in addition to the user-sensed benefit of not having to travel to the location of a store-based terminal, there is a benefit to the data vendor, in that business is possible even at a location that does not have a store-based terminal.

The present invention provides an easily portable terminal which, using a network such as the Internet, makes it possible to obtain music content from around the world, whether at a store or at home and to port this content with the user.

The fifth aspect of the present invention is a recording medium onto which data content is stored, this recording medium having a common header area, in which control information that is common to a plurality of data contents is recorded, and a content area, in which the plurality of data contents are recorded. The content area has a content header area, into which is recorded control information that is unique to each of the data contents, and a content data area, into which the actual data contents are recorded. A content identification code that is unique to each data content is recorded in the content header area, and each of the data contents that is recorded in the content data area is encoded with a prescribed key.

Each of the data contents is encoded by means of an encryption key that is unique to the receiving means for receiving the data content. On the data content sending side, the receiving means identification code or memory card identification code is received from the receiving means, this receiving means identification code or memory card identification code being used to encode an encryption key, the data content being encoded (scrambled) by means of the encryption key, this scrambled data content and the encryption key being transmitted.

That is, if the receiving means differs, because the receiving-side terminal ID or the memory card ID will differ, the encryption key (decode key) after scrambling will also be different. Thus, it is not possible for data content that have been scrambled by a given receiving means identification code to be descrambled by a different receiving means, thereby providing protection of the data content from illegal copying.

It is preferable that the data content be compressed, and the method used to compress the data content be recorded in the data content header area. By selecting the compression method that offers the highest compression efficiency with the type of data content, and then recording the type of compression that was used in the data content header area, it is possible to employ data expansion that corresponds to the type of data compression that was selected.

It is additionally preferable that the TOC (table of contents) of each data content be recorded in the common header area and/or the data content header area. By recording the TOC, it is possible to quickly cue specific contents.

The sixth aspect of the present invention is an apparatus for encoding data content, this apparatus minimally having a signal compression means, an identification signal generation means, a formatting means, and a scrambling means, the above-noted signal compression means compressing the data content, the identification signal generation means generating common control information that is common to the data contents and individual control information for each data content, the formatting means recording the common control information in the common header area, recording the individual control information in each of the data content header areas, and recording each data content in each data content area, and the scrambling means scrambling the data content with a code key that is unique to the receiving means that received the data content.

The seventh aspect of the present invention is an apparatus that decodes data content that have been encoded by the above-noted encoding apparatus, this decoding apparatus minimally having a descrambling means, a deformatting means, and a signal expansion mean, the descrambling means descrambling the data content, using the encryption key that is unique to the receiving means used to receive the data content, the deformatting means separating the descrambled data content from the common control information, and the signal expansion means expanding the separated data content.

According to the present invention, by scrambling data content using a encryption key, and by scrambling the encryption key with an identification code that is unique to each receiving means and transmitted this scrambled encryption key, it is possible to distribute one and the same data content along with a decode key that is different for each receiving means. For this reason, even if it were possible to obtain this scrambled data at a receiving means that is different from the one that performed authorized reception of the data content, it is not possible to play the data content back.

The data content is compressed by one of a plurality of data compression methods, and identification information for the compression method that was used is recorded in the data content header area. This enables selection of the data compression method, with the properties of the data content, so as to achieve highly efficient data compression and transmission. Further, since the used area was recorded, the used area can be limited.

Additionally, by locating the TOC in either the common header or the individual data content header, it is easy to cue the various tracks of data content that exist on a plurality of tracks. Additionally, by recording the data transfer history, it is possible to recover this and perform copyright management.

BRIEF DESCRIPTION OF THE DRAWINGS

FIG. 2 is a simplified drawing that shows the flow of data in the first embodiment of the present invention.

FIG. 4 is a flowchart that shows the flow of processing in the store-based terminal in the first embodiment of the present invention.

FIG. 17 is a block diagram that shows the concept of the fourth embodiment of the present invention.

FIG. 18 is a simplified drawing that shows the flow of data in the fifth embodiment of the present invention.

FIG. 20 is a flowchart that shows the flow of processing in the store-based terminal in the fifth embodiment of the present invention.

FIG. 21 is a flowchart that shows the flow of processing in the content center of the fifth embodiment of the present invention.

FIG. 27 is a timing diagram that shows the transmission of data from the buffer circuit of FIG. 26 to the signal processing circuit.

DETAILED DESCRIPTION OF THE PREFERRED EMBODIMENTS

Preferred embodiments of the present invention will be described in detail below, with reference to the accompanying drawings.

Figure 1:
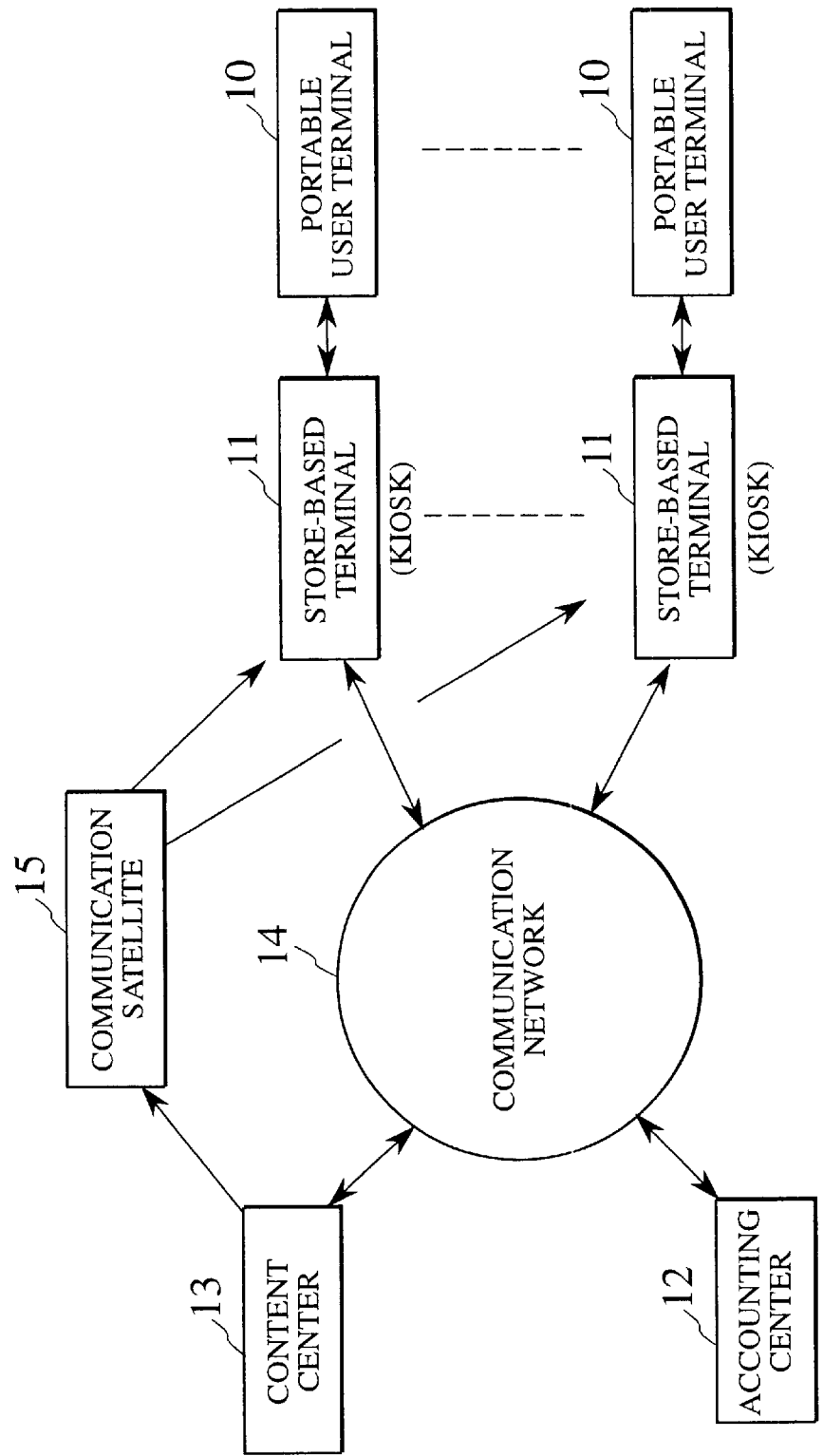
FIG. 1 is a block diagram that shows the concept of the first embodiment of the present invention.

FIG. 1 is a conceptual block diagram of the first embodiment of the present invention. The system of this embodiment is formed by user portable terminals 10, store-based terminals 11, a billing center 12, a content center 13, a communication circuit 14, and a communication satellite 15. The store-based terminal 11 is equipped in a kiosk, for example.

The portable terminals 10 each have a unique ID. The store-based terminals 11, the billing center 12, and the content center 13 perform transfer of various data, via the communication circuit 14. The data content is transferred by the content center 13, via the communication satellite 15, to the store-based terminals 11.

After the portable terminal 10 receives the data content via the store-based terminal 11, the portable terminal 10 is separated from the store-based terminal 11, enabling the portable terminal 10 to be freely carried around, so that it can be used at any time to play back the data content (for example, music data) that it has received.

FIG. 2 is a drawing that illustrates the concept of the data flow in the first embodiment. As shown in this drawing, a portable terminal ID or a memory card ID 20 is sent from the portable terminal 10 to the billing center 12, via a store-based terminal 11. The store-based terminal ID 21 above-described the content ID 22 are sent to the billing center 12 from a store-based terminal 11. Billing information 23 is sent from the billing center, via the store-based terminal, to a portable terminal. Electronic money 24 is sent from the portable terminal, via the store-based terminal, to the billing center. The portable terminal ID or memory card ID 20, the store-based terminal ID 21, the data content ID 22, and a data content sent request signal 25 are sent form the store-based terminal to the content center, without the intervention of the billing center. The data content 26 is sent from the content center, via the store-based terminal, to the portable terminal, without the intervention of the billing center.

As electronic money 24, for example Mondex or VISA Cash can be used, wherein an amount of money is stored onto an IC chip, this being passed through an IC card reader to perform payment.

Figure 3A:
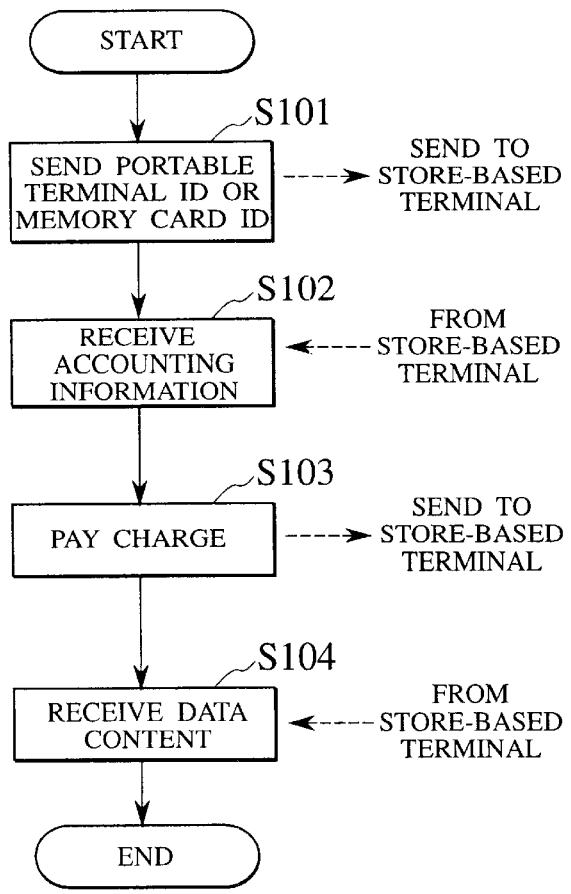
FIG. 3 is a flowchart that shows the flow of processing in a user portable terminal in the first embodiment of the present invention.
Figure 3B:
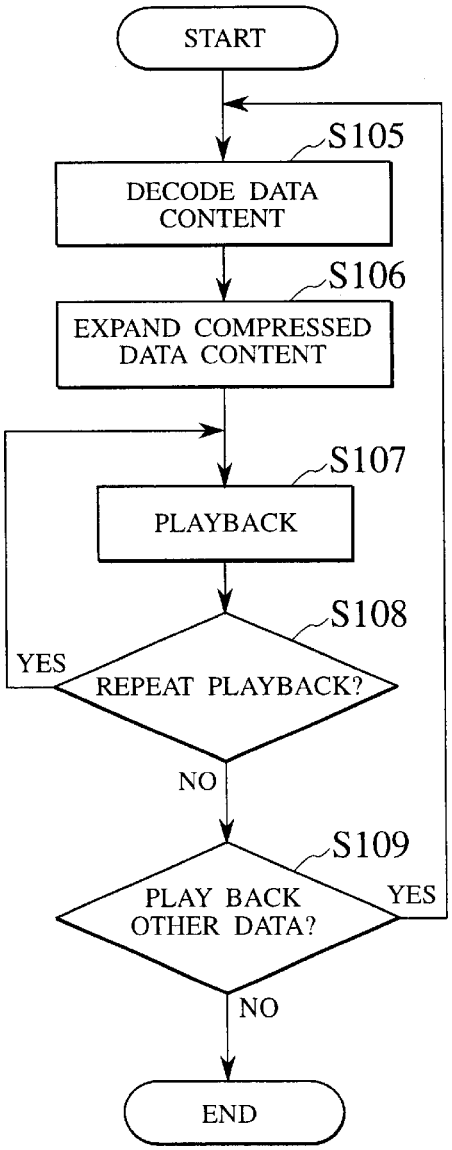

FIG. 3A and FIG. 3B are flowcharts that show the flow of processing in a user portable terminal in the first embodiment. FIG. 3A shows the flow of processing when data content is purchased. When connection is made to a store-based terminal, the portable terminal ID or memory card ID is sent from the portable terminal the store-based terminal (step 101). When the store-based terminal received the billing information from the store-based terminal (step 102), electronic money in an amount that corresponds to the billing amount is sent from the electronic wallet of the portable terminal to the store-based terminal (step 103), and data content is received from the store-based terminal (step 104). FIG. 3B shows the flow of processing when data content is played back. Data that is encoded by means of a portable terminal ID or a memory card ID is decoded by the decoding section in using either the portable terminal ID or memory card ID (step 105), the decoded data being expanded by the expanding section (step 106), after which the expanded data can be played back by the playback section (step 107). If playback is to be repeated (result of YES at step 108), return is made to step 107, and if playback is not to be repeated (result of NO at step 108), control proceeds to step 109. If other data is to be played back (result of YES at step 109), return is made to step 105, and if other data is not to be played back (result of NO at step 109), the processing ends.

Because data content is stored in the storage section of the portable terminal in compressed, encoded form, when data is to be played back, it is necessary to decode and expand it to restore the original data.

The data compression technology used in the present invention can be selected from such technologies as TwinVQ™, AAC (Advanced Audio Coding), MPEG (Motion Picture Experts Group) Layer1, MPEG Layer3, and ATRAC (Adaptive Transform Acoustic Coding).

FIG. 4 is a flowchart that shows the flow of processing in the store-based terminal in the first embodiment of the present invention. After the portable terminal ID or the memory card ID is received from the portable terminal (step 201), when the user inputs a request (step 202), the content ID corresponding the input request is searched for (step 203), and the portable terminal ID or memory card ID, the store-based terminal ID, and the data content ID are transmitted to the billing center (step 204). If a transmission enabling signal is received form the billing center (result of YES at step 205) and the billing information is received (step 206), the billing information is transmitted to the portable terminal (step 207). If it was possible to bill the portable terminal an amount of electronic money that corresponds to the data content price (step 208), a data content send request signal and the ID of the data content that is requested are transmitted to the content center (step 209). After reception of the data content from the content center (step 210), the data content is encoded (step 211), using the portable terminal ID or memory card ID as an encrypting key, and the encoded data is transmitted to the portable terminal (step 212).

In the case in which a transmission enabling signal is not received from the billing center (result of NO at step 205), a message is displayed to indicate that transmission was not permitted.

Figure 5:
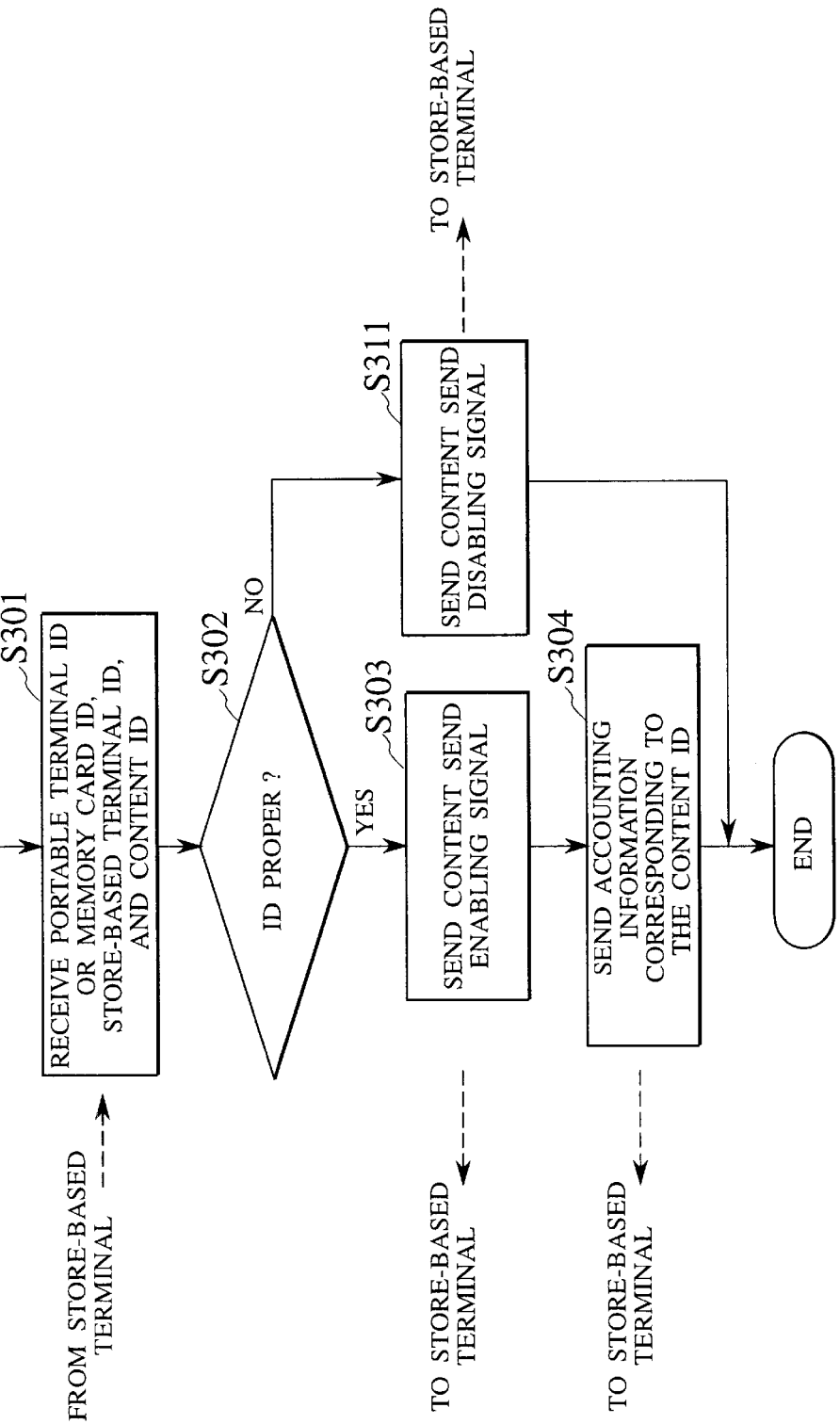
FIG. 5 is a flowchart that shows the flow of processing at the billing center in the first embodiment of the present invention.

FIG. 5 is a flowchart that shows the flow of processing at the billing center in the first embodiment of the present invention. First, after the portable terminal ID or memory card ID, the store-based terminal ID, and the data content ID are received from the store-based terminal (step 301), a judgment is made as to whether the portable terminal ID or memory card ID, and the store-based terminal ID are proper (step 302). If both is a drawing that shows are judged to be proper (result of YES at step 302), a data content transmission enabling signal is transmitted to the store-based terminal (step 303). A content price table is referenced, and data content billing information corresponding to the data content ID is also sent to the store-based terminal (step 304).

If either one of the IDs is judged to be improper, a signal that indicates that it is not possible to send the data content is sent to the store-based terminal (step 311).

Figure 6:
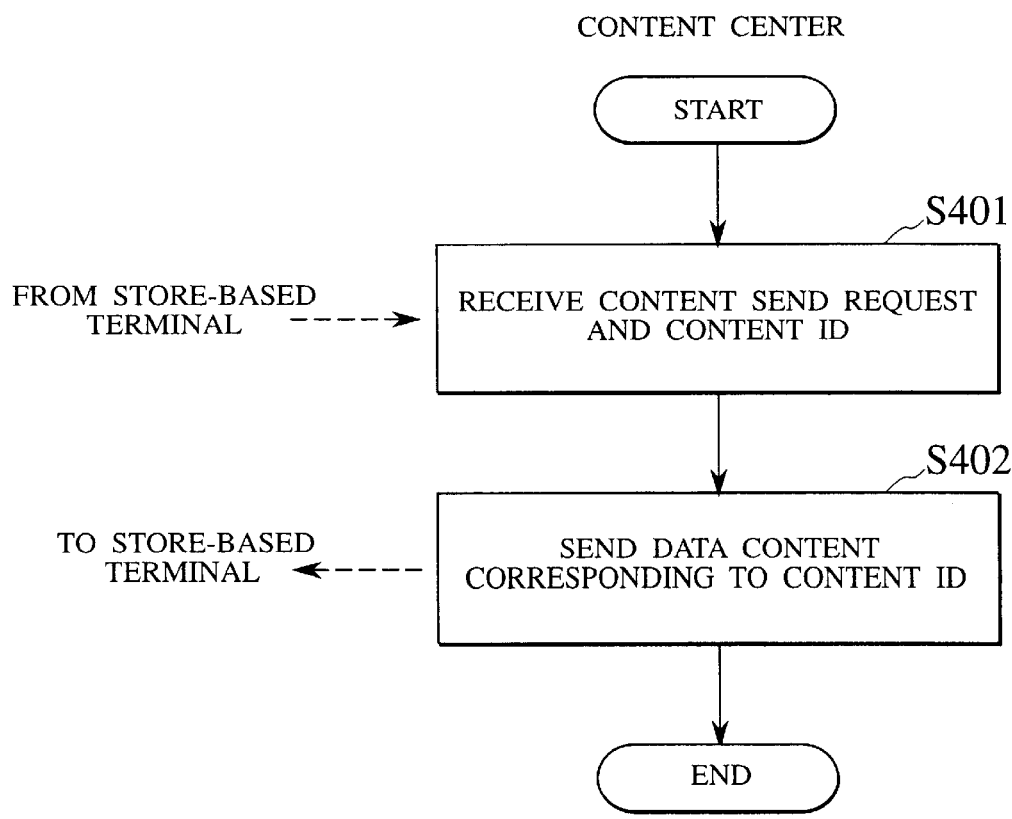
FIG. 6 is a flowchart that shows the flow of processing at the content center in the first embodiment of the present invention.

FIG. 6 is a flowchart that shows the flow of processing at the content center in the first embodiment of the present invention. After reception from the store-based terminal of the content send request signal and the data content ID of the data content which is requested (step 401), data content that corresponds to the data content ID is sent to the store-based terminal (step 402).

Figure 7:
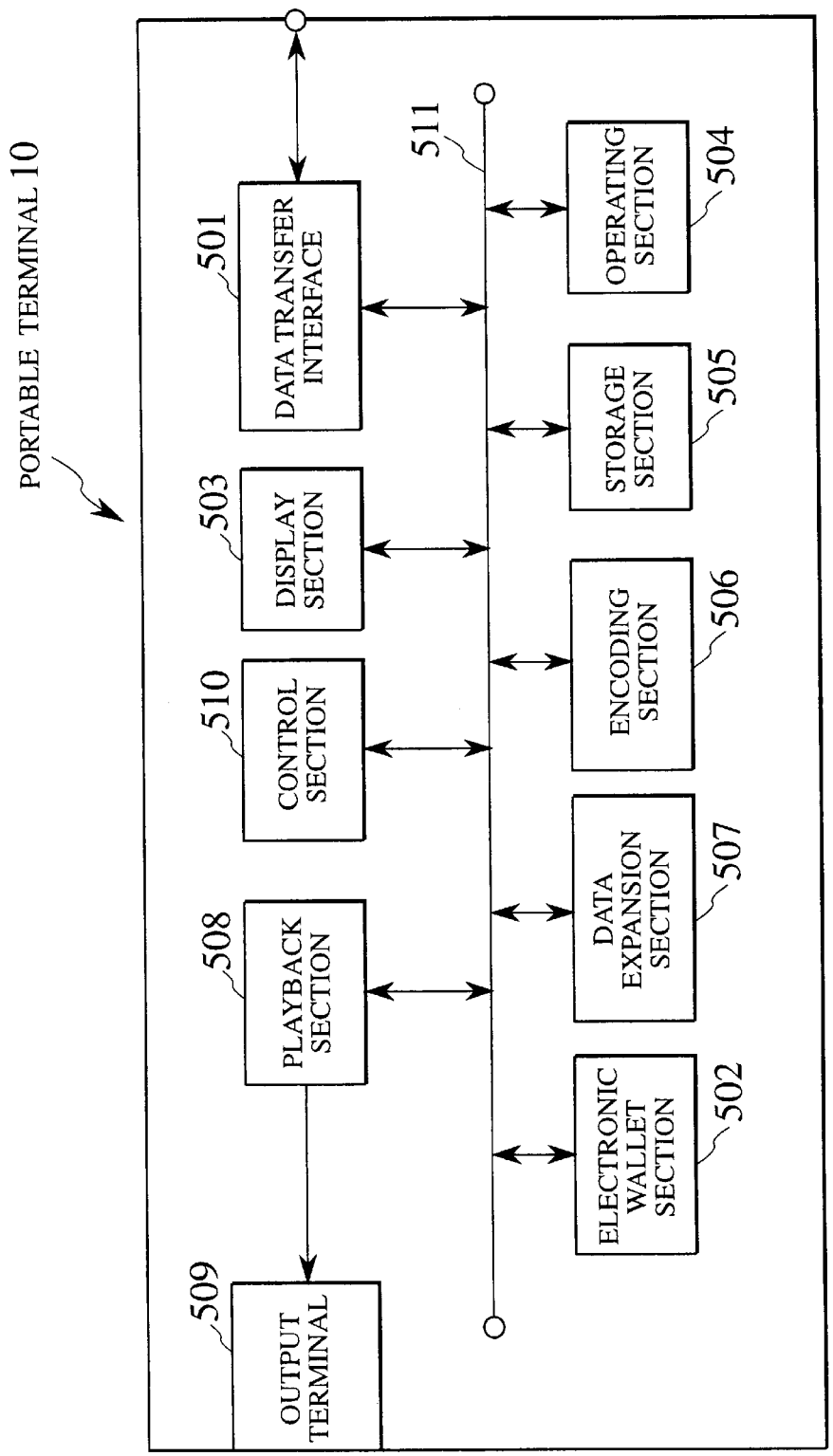
FIG. 7 is a drawing that shows the configuration of a portable terminal that is used in the first embodiment of the present invention.

FIG. 7 is a block diagram that shows the configuration of a portable terminal that is used in the first embodiment of the present invention. The portable terminal 10 is formed by a data transfer interface 501, an electronic wallet section 502, a display section 503, a storage section 504, an operating section 505, a decoding section 506, a data expansion section 507, a playback section 508, an output terminal 509, and a control section 510, these elements being connected via an internal bus 511.

The data transfer interface 501 is an interface for data transfer between the portable terminal and the store-based terminal. Via this interface, the portable terminal ID or memory card ID, and electronic money and the like are sent from the portable terminal to the store-based terminal, and data content and the like are sent from the store-based terminal to the portable terminal. The electronic wallet section 502 can receive electronic money and make payments, in a prepaid electronic money system in which electronic money is pre-deposited, this electronic money being transferred to a store-based terminal in accordance with the price of the data content.

The display section 503 displays such items as the electronic money balance of the electronic wallet, the transmission/reception status when performing data transfer with the store-based terminal, and the playback status when playing back data content. The operating section 504 is used to perform such operations as cueing the beginning of data in order to search for data to be played back from among a plurality of data, and adjustment of the playback volume. The storage section 505 stores the data content that is received from the store-based terminal, and the portable terminal ID or memory card ID. This storage section 505 can also be configured to hold within it a memory card that has an ID. The decoding section 506 decodes the data content that are stored in the storage section 505, according to the portable terminal ID or memory card ID. The data expansion section 507 expands the compressed data content. The playback section 508 plays back music and the like from the data content. The playback music, for example, is output to the outside via the output terminal 509. The control section 510 performs control of the above-noted elements.

Figure 8:
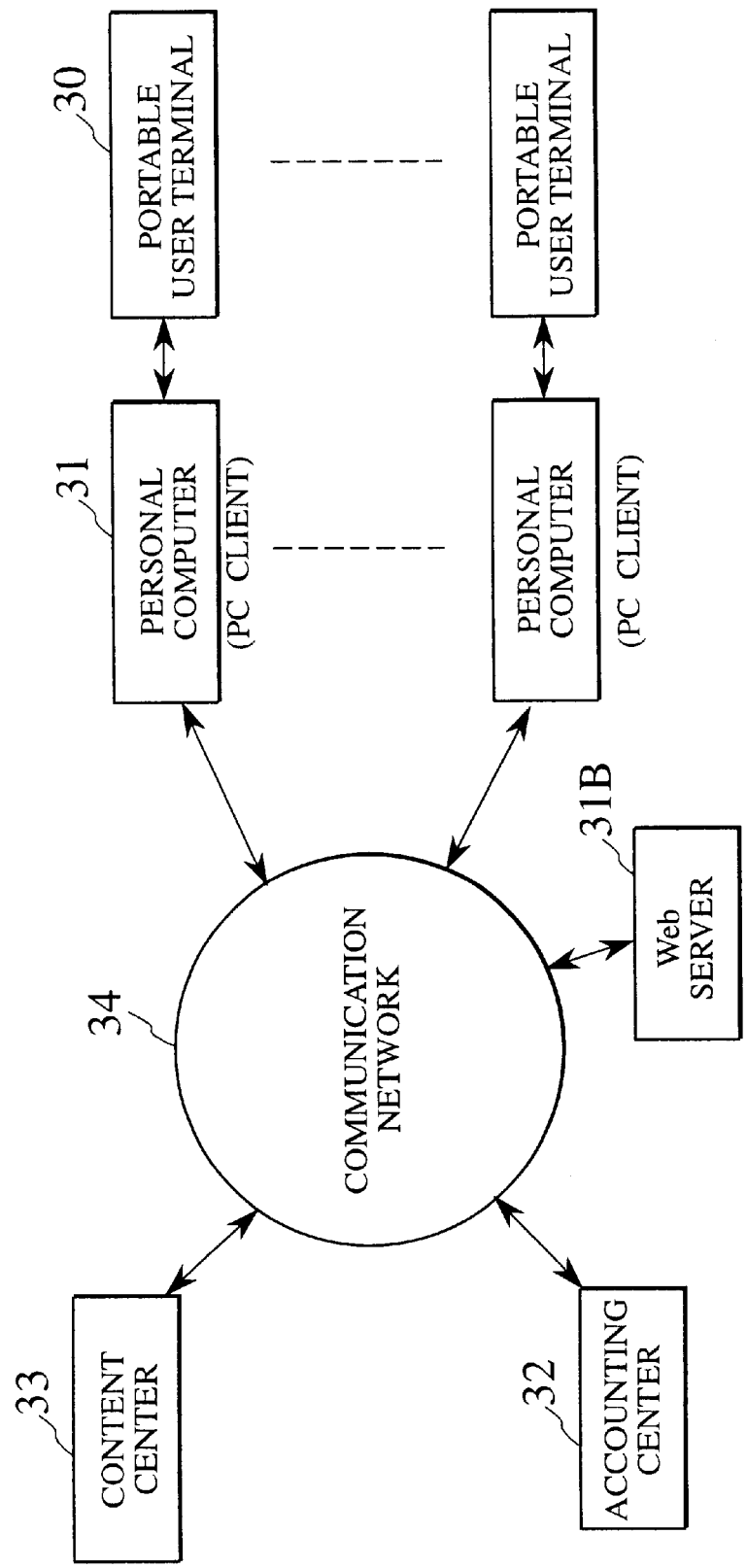
FIG. 8 is a block diagram that shows the concept of the second embodiment of the present invention.

FIG. 8 is a block diagram that shows the concept of the second embodiment of the present invention. The difference in the second embodiment in comparison to the first embodiment is that it does not make use of a communication satellite, and uses a personal computer 31 as a PC client, and Web server 31B, in place of the store-based terminal. Data transfer between the portable terminal 30 and the personal computer 31, as is the case with the first embodiment, is performed via a high-speed interface equivalent to the IEEE 1394. Not only transfer of data such as the portable terminal ID or memory card ID, but also transfer of the data content is perform using a communication network such as the Internet. In the first embodiment, which uses a communication satellite, data content is transferred via a communication satellite antenna (not shown in the drawing) to a store-based terminal, whereas in the second embodiment, which makes use of a communication circuit, data content is transferred to the personal computer 31, via a modem or terminal adapter (TA).

Compared with the case of using a communication satellite, by using a communication circuit, the transfer speed is slower, so that more time is required for data transfer. However, this arrangement enable use of the system without going to a location at which a store-based terminal is installed, enabling use from a home PC, via a modem or terminal adapter.

In order to use this system from a home, in addition to having a personal computer and a modem (or terminal adapter), it is necessary to have an electronic money remittance system (including, for example, an electronic money card reader) in the home. In addition to an IC card type of electronic money, it is possible to use network-type electronic money, such as e-cash, that is suitable for application to online shopping on the Internet.

The sending of electronic money from the portable terminal 30 to the billing center 32, and the sending of data content from the content center 33 to the portable terminal 30 is the same as was described for the first embodiment.

Figure 9:
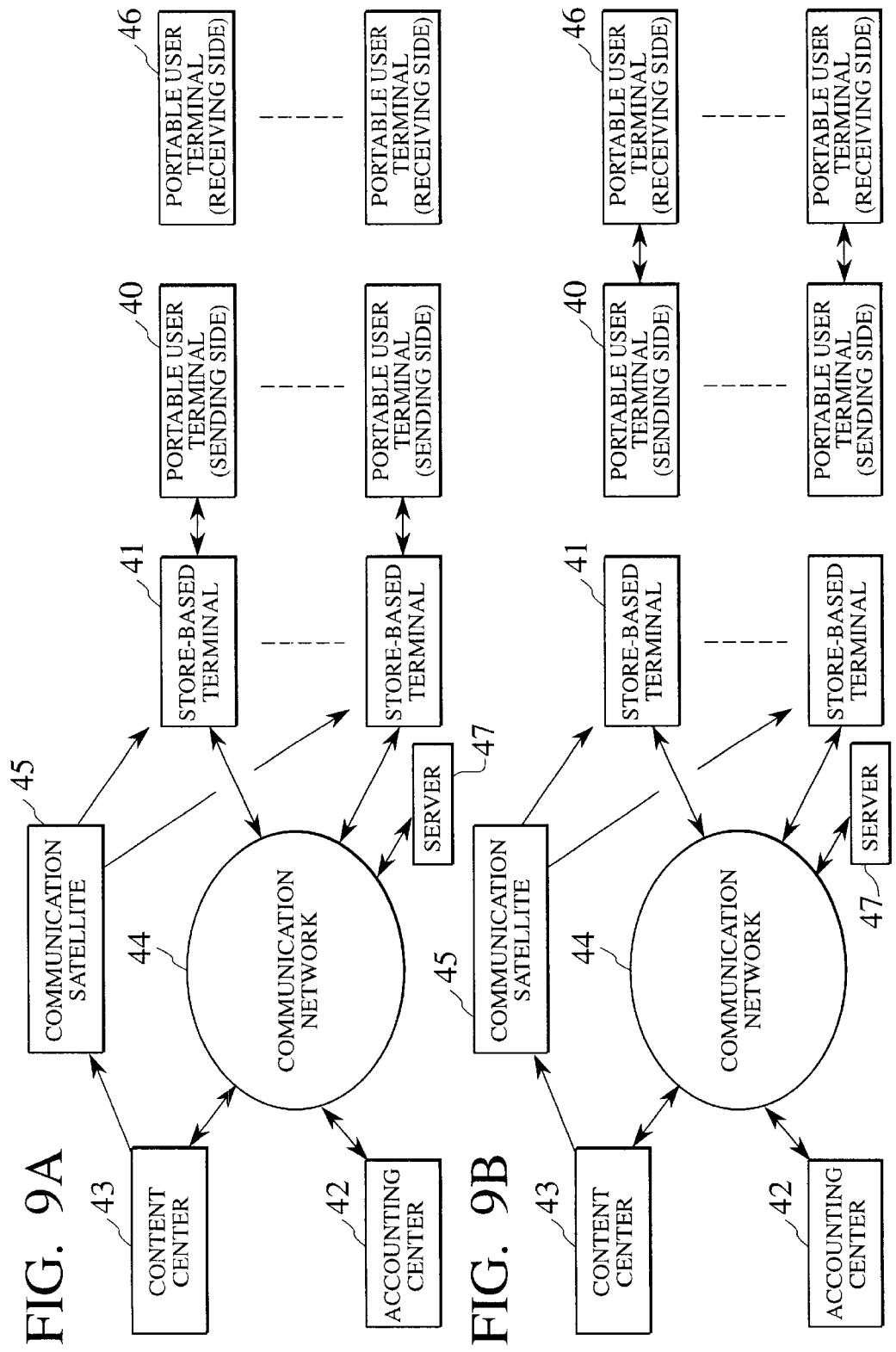
FIG. 9 is a block diagram that shows the concept of the third embodiment of the present invention.

FIG. 9A and FIG. 9B are block diagrams which illustrate the concept of the third embodiment of the present invention.

In this system, in addition to permitting copying (transferring) data content between portable terminals, it is possible to bill for this copying, which is the difference in this system in comparison to the systems of the first and second embodiments, and a sever 47 is employed for the store-based terminal 41 as supplement.

As shown in FIG. 9A, a portable terminal (transmission side) 40 can receive data content from the content center 43, after the same type of processing that is done in the case of the first and second embodiments. The sending side portable terminal 40 and the receiving side portable terminal 46 are distinguished as "receiving" and "sending" sides merely as a convenience. In reality, both have both receiving and sending functions, and are the same in terms of hardware.

As shown in FIG. 9B, after reception of data content, the portable terminal (sending side) 40 is removed from the store-based terminal 41, to enable it to be freely carried about, and also to enable the data content stored in the portable terminal (sending side) 40 to be copied into the portable terminal (receiving side) 46, in which copying the store-based terminal 41 plays no role. That is, it is possible to copy data content between the portable terminal (sending side) 40 and the portable terminal (receiving side) 46 in a location in which there is no store-based terminal 41. A charged is billed for the copying of data content between portable terminals, and an amount of electronic money that corresponds to the price of the data content is sent from the portable terminal (receiving side) 46 to the portable terminal (sending side) 40. When copying of data content is performed between portable terminals, the portable terminal ID or memory card ID of the portable terminal (receiving side) and data content ID of the copied data content are stored in the portable terminal (sending side) as a history of the copying operation. At a later date, when the portable terminal (sending side) 40 is connected along with electronic money to a store-based terminal 41, this copying history is read into the store-based terminal 41 from the portable terminal 40 and sent to the billing center 42. By doing this, similar to the case of the first and second embodiments, it is possible to collect information with regard to what contents were acquired by what portable terminal, and to collect electronic money in the billing center 42.

Figure 10:
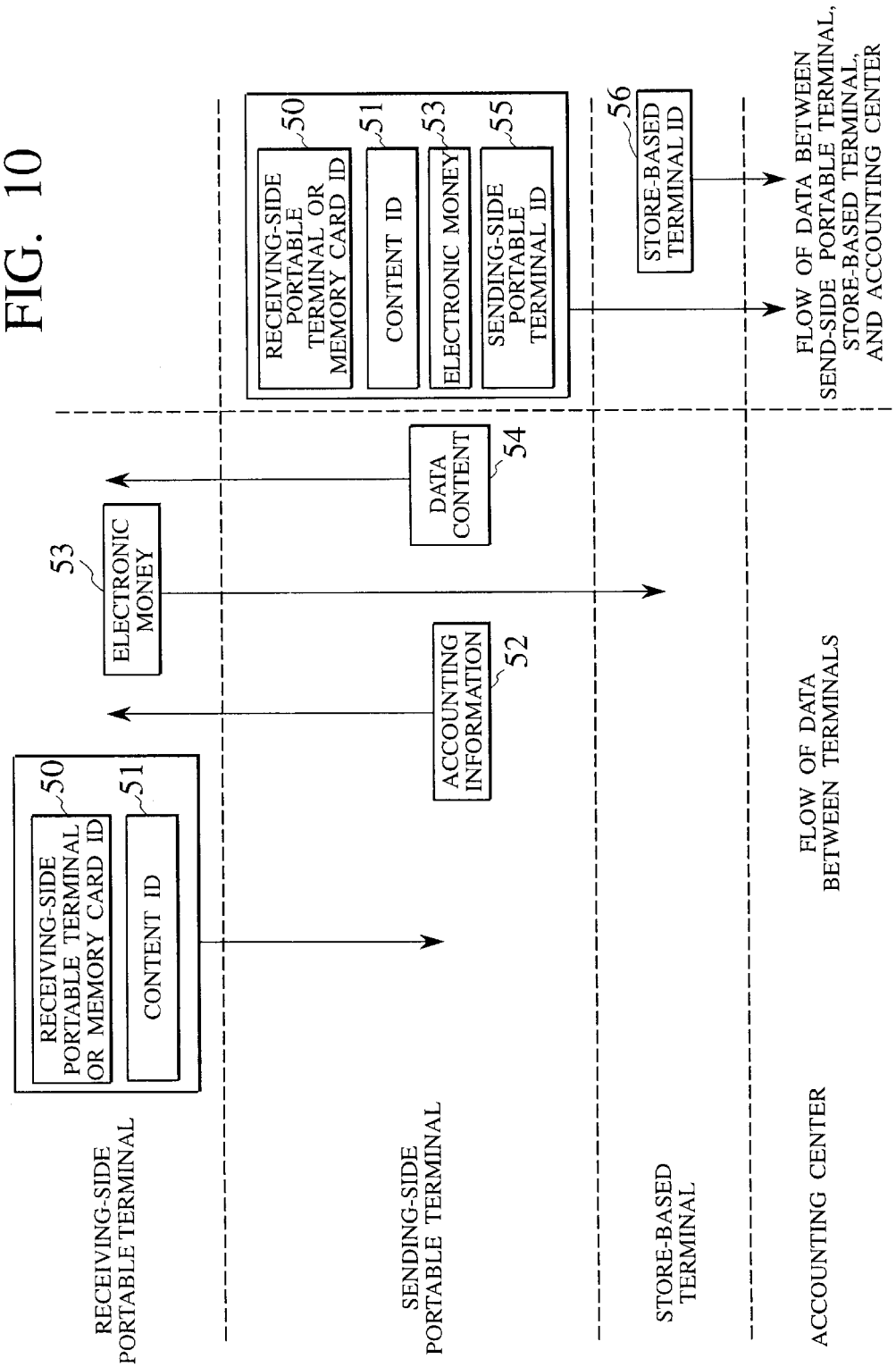
FIG. 10 is a simplified drawing that shows the flow of data in the third embodiment of the present invention.

FIG. 10 is a drawing which shows the flow of data in the third embodiment of the present invention. As shown in this drawing, the receiving-side portable terminal ID or memory card ID 50 and the data content ID 51 are sent from the portable receiving-side portable terminal to the sending-side portable terminal. Next, billing information 52, which corresponds to the data content ID 51, is sent from the sending-side portable terminal to the receiving-side portable terminal. Then, electronic money 53 is dent from the receiving-side portable terminal to the sending-side portable terminal as payment for the data content. When this electronic money 53 is received, data content is sent form the sending-side portable terminal to the receiving-side portable terminal. In this manner, even without a store-based terminal, it is possible to send and receive data contents between portable terminals and to access charges for the data content.

After transfer of data between-portable terminals, when the sending-side portable terminal is connected to a store-based terminal, the receiving-side portable terminal ID or memory card ID 50, the data content ID 51, the electronic money 53, and the sending-side portable terminal ID or memory card ID 55 are sent from the sending-side portable terminal, via the store-based terminal, to the billing center, the store-based terminal ID 56 also being sent to the billing center. By doing this, the history of transfer of data content between the portable terminals and electronic money 53 as payment for the data content are collected by the billing center.

In contrast to copyright protection technology of the past, which has as an object the prevention of data copying between individuals, this embodiment of the present invention not only permits such personal copying of data, and also enables a charge to be accessed at the time of data transfer, thereby enabling reimbursement of the copyright holder for the use of the data.

Figure 11:
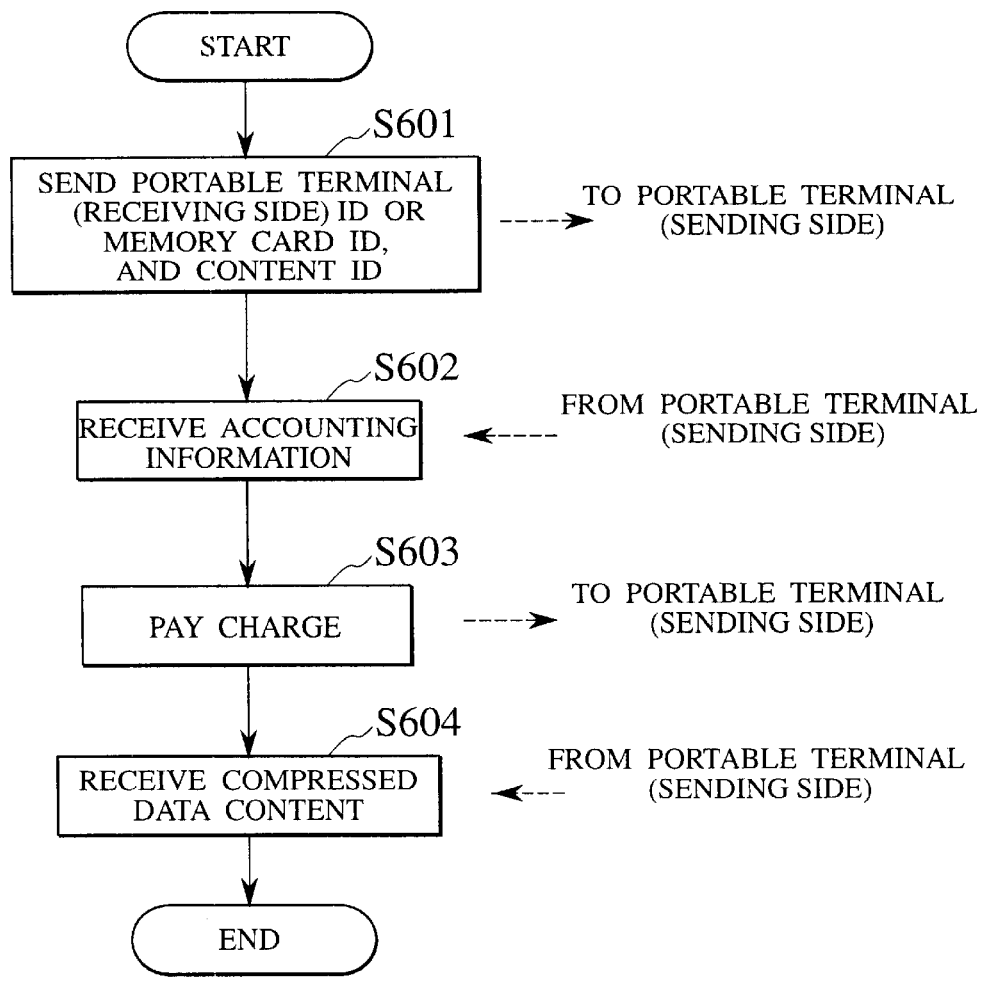
FIG. 11 is a flowchart that shows the flow of processing in the receiving-side portable terminal if the third embodiment of the present invention.

FIG. 11 is a flowchart that shows the flow of processing in a receiving-side portable terminal in the third embodiment of the present invention. When the sending-side portable terminal is connected to a store-based terminal, the receiving-side portable terminal ID or memory card ID and data content ID of the data content requested to be transferred are sent to the sending-side portable terminal (step 601). Next, billing information corresponding to the data content ID is received from the sending-side portable terminal (step 602). Electronic money corresponding to the price of the data content, which is included in the billing information, is paid (reduced) and an electronic money information that electronic money was paid is sent to the sending-side portable terminal (step 603). Then, compressed data content that is encoded based on the receiving-side ID is received from the sending-side portable terminal (step 604).

Figure 12:
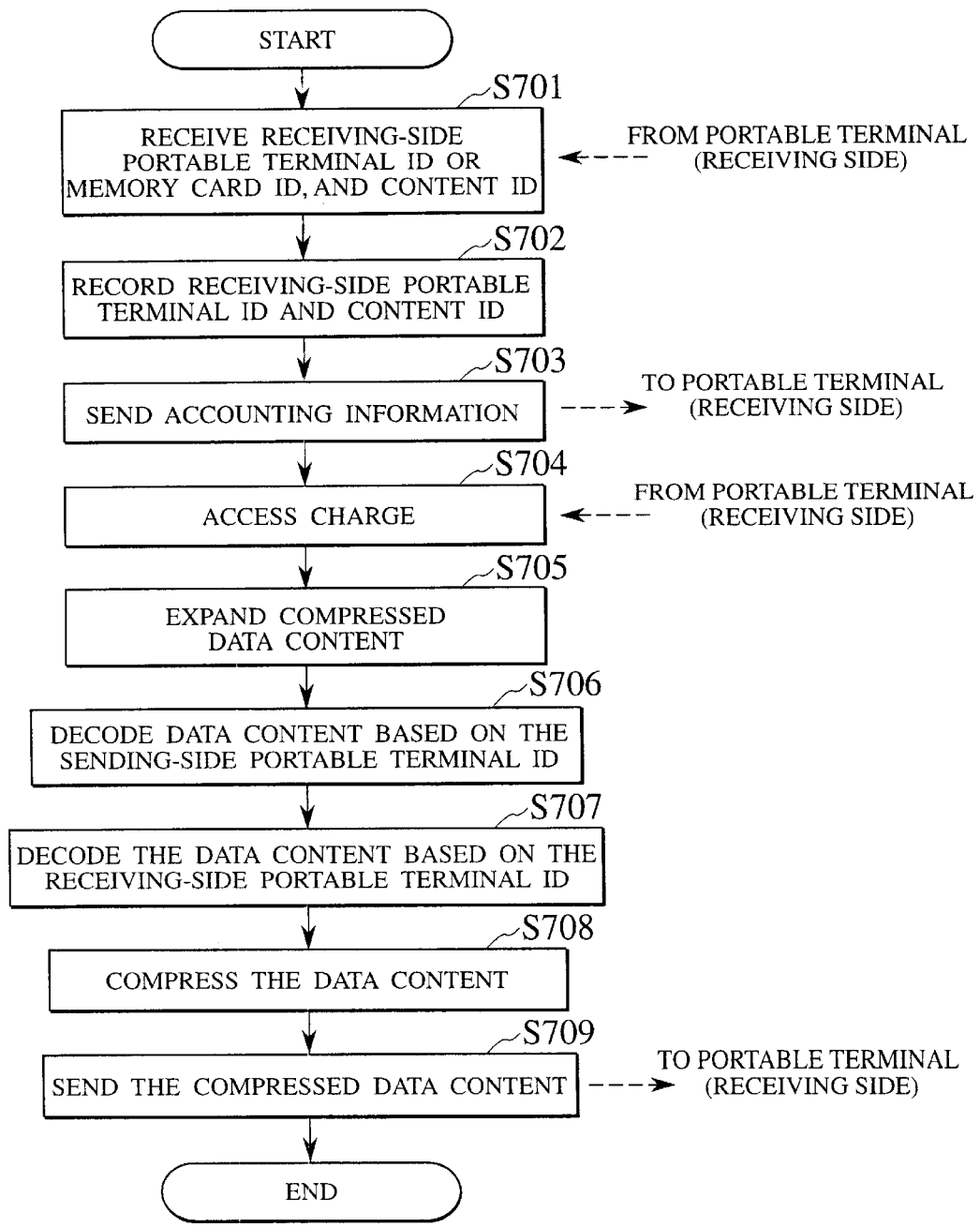
FIG. 12 is a flowchart that shows the flow of processing in the sending-side portable terminal when data transfer is done with the receiving-side portable terminal in the third embodiment of the present invention.

FIG. 12 is a flowchart that shows the flow of processing in the sending-side portable terminal when data transfer is performed with the receiving-side portable terminal in the third embodiment of the present invention. The portable terminal ID or memory card ID and the data content ID are received from the receiving-side portable terminal (step 701), both IDs are stored (step 702), and billing information that corresponds to the received data content is sent to the receiving-side portable terminal (step 703). Next, the electronic money information corresponding to billing information is received from the receiving-side portable terminal (step 704). Before sending the data content to the receiving-side portable terminal, the data content that is encoded in accordance with the sending-side ID are encoded in accordance with the receiving-side ID. To do this, first the encoded, compressed data content is expanded (step 705). Next, the data content is decoded in accordance with the sending-side ID (step 706). Then, the data content is encoded in accordance with the receiving-side ID (step 707). Next, the decoded data content is compressed (step 708). The encoded and compressed data content is then sent to the receiving-side portable terminal (step 709). In addition, the expansion (step 705) and the compression (step 708) may be eliminated. As shown in FIG. 11 and FIG. 12, the store-based terminal, the billing center and the content center play no role when data content is transferred between portable terminals.

In the above-noted embodiment, decoding is done at the sending side in accordance with the sending-side ID and encoding is further done in accordance with the receiving-side ID before data is transmitted. The reason data is encoded in this manner is so that, even if data is illegally copied, it will not be possible to play the data back except by the proper portable terminal. For this reason, data is stored in the portable terminal in an encoded state and, because of the great possibility of illegal copying of data when data is transferred between portable terminals, data is encoded at the time of transfer as well.

Figure 13:
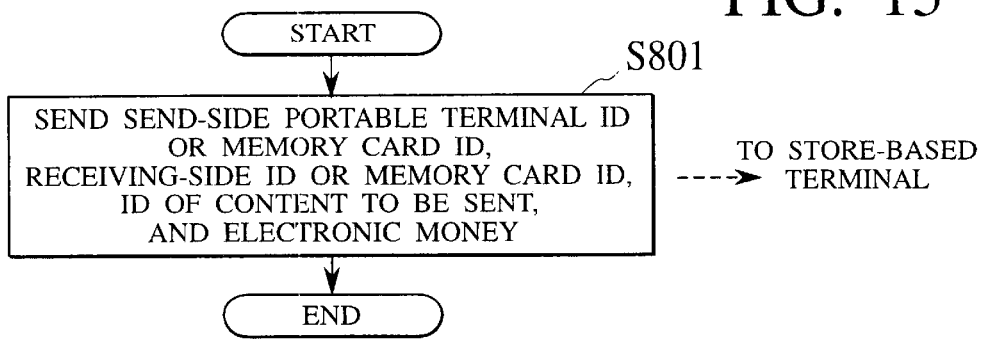
FIG. 13 is a flowchart that shows the flow of processing in the sending-side portable terminal when data transfer is done with the store-based terminal in the third embodiment of the present invention.

FIG. 13 is a flowchart that shows the flow of processing in the sending-side portable terminal when data transfer is performed between it and a store-based terminal in the third embodiment. After performing transfer of data between portable terminals, when the sending-side portable terminal is connected to a store-based terminal, the receiving-side portable terminal ID or memory card ID, the sending-side portable terminal ID or memory card ID, the data content ID of the data content that was transferred, and electronic money are sent from the sending-side portable terminal to the store-based terminal (step 801).

Figure 14:
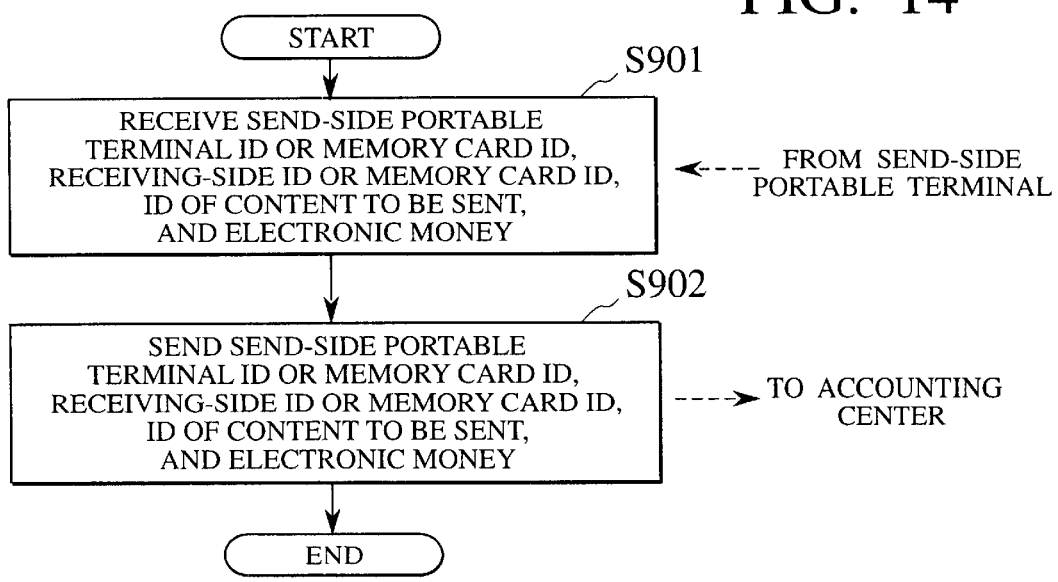
FIG. 14 is a flowchart that shows the flow of processing in the store-based terminal in the third embodiment of the present invention.

FIG. 14 is a flowchart that shows the flow of processing in a store-based terminal in the third embodiment. First, the receiving-side portable terminal ID or memory card ID, the sending-side portable terminal ID or memory card ID, the data content ID of the data content that was sent, and electronic money are received from the sending-side portable terminal (step 901). Next, these IDs and the store-based terminal ID are sent to the billing center (step 902).

Figure 15:
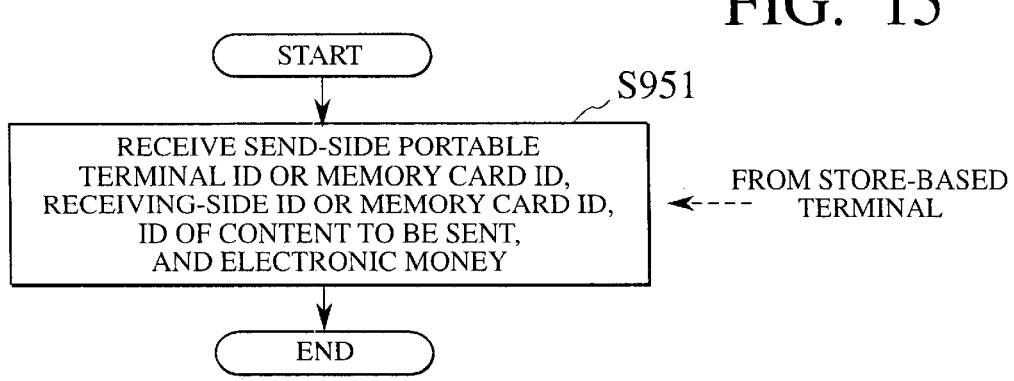
FIG. 15 is a flowchart that shows the flow of processing in the billing center in the third embodiment of the present invention.

FIG. 15 is a flowchart that shows the flow of processing in the billing center in the third embodiment. The receiving-side portable terminal ID or memory card ID, the sending-side portable terminal ID or memory card ID, the data content ID of the data content that was sent, electronic money, and the store-based terminal ID are received from the store-based terminal (step 951). By doing this, the transfer history with regard to copying between portable terminals and billing for copying between portable terminals or electronic money information are collected in the billing center.

In the above-noted third embodiment, because billing can be done even with respect to transfer between individuals, even if such data transfer between individuals is permitted, it is possible to ultimately reimburse the copyright holder for use of the data. From the portable terminal ID or memory card ID, it is possible to know the information (such as age and gender) with regard to the owner of the portable terminal, making it possible to determine, for example, what type of users transferred data to what type of users, this information representing detailed market information.

Figure 16:
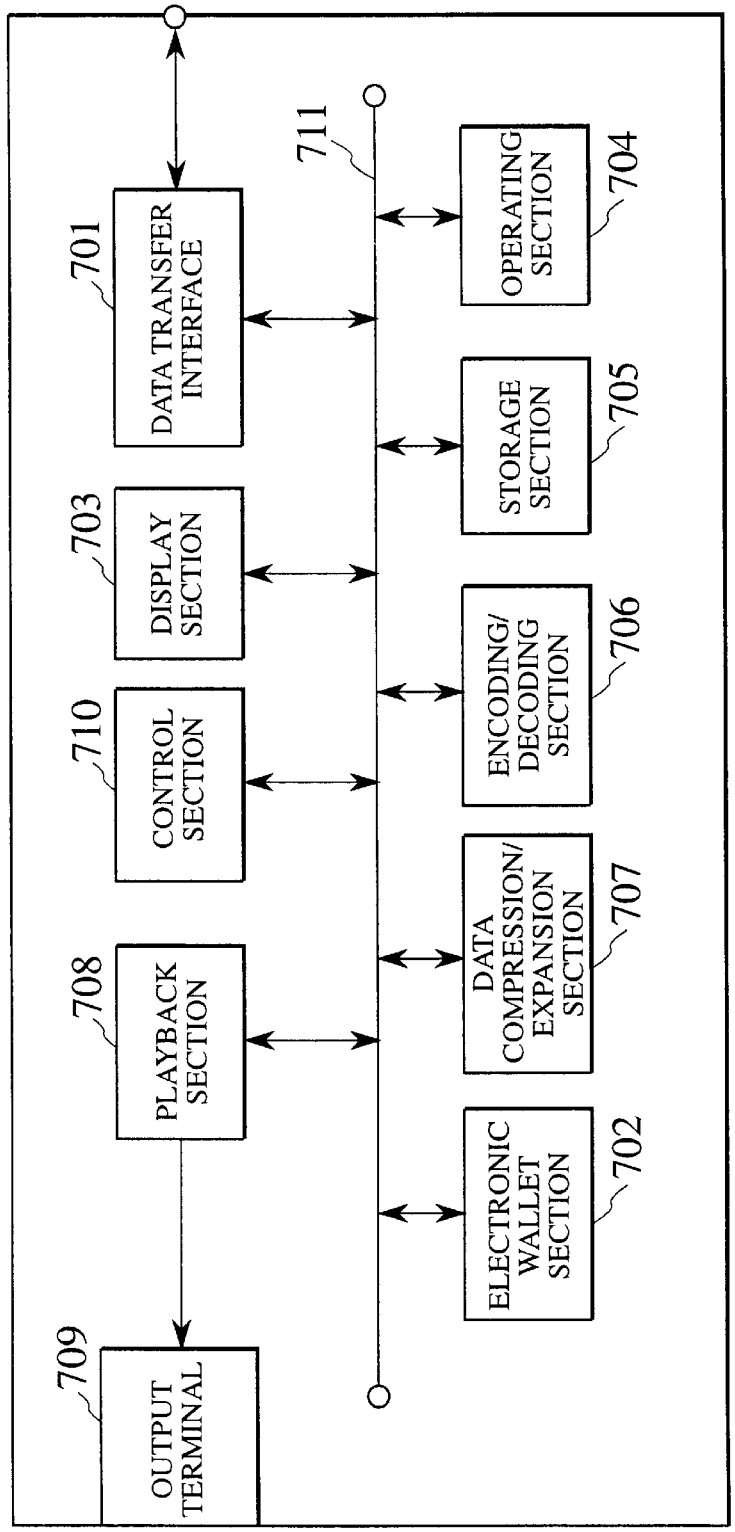
FIG. 16 is a drawing that shows the configuration of a portable terminal used in the third embodiment of the present invention.

FIG. 16 is a drawing that shows the configuration of a portable terminal that is used in the third embodiment of the present invention. The portable terminal 40 is formed by a data transfer interface 701, an electronic wallet section 702, a display section 703, an operating section 704, a storage section 705, an encoding/decoding section 706, a data compression/expansion section 707, a playback section 708, an output terminal 709, a control section 710, and an internal bus 711.

The data transfer interface is used to perform data transfer between the sending-side portable terminal and the receiving-side portable terminal, and between a portable terminal and a store-based terminal. Via this interface 701, the portable terminal ID or memory card ID, electronic money, and data content and the like are transferred between portable terminals or between a portable terminal and a store-based terminal.

The electronic wallet section 702 can receive electronic money and make payments. In a prepaid electronic money system, in which electronic money is pre-deposited, this electronic money being transferred to the billing center 42 or reduced without transfer in accordance with the price of the data content. The balance of electronic money can be added to at the store-based terminal.

The display section 703 displays such items as the electronic money balance of the electronic wallet section, the transmission/reception status when performing data transfer between portable terminals, and the playback status when playing back data content. The operating section 804 is used to perform such operations as cueing the beginning of data in order to search for data to be played back from among a plurality of data, and adjustment of the playback volume. The storage section 805 stores data content that is received from a store-based terminal, and data content that is received from another portable terminal. The storage section 705 has stored in it the portable terminal ID or memory card ID. The storage section can also be configured to hold within it a memory card that has an ID.

The encoding/decoding section 706 performs encoding and decoding of data content. The data content that is stored in the storage section is encoded in accordance with the portable terminal ID. In order to play back the encoded data, it must be decoded before playback. Each portable terminal has a unique ID, and data is encoded based on each of these IDs. For example, if a portable terminal A has an ID of ID (A), and a portable terminal B has an ID of ID (B), the data content that is stored in the storage section of the portable terminal A is encoded in accordance with ID (A), whereas the data content that is stored in the storage section of the portable terminal B is encoded in accordance with ID (B). The identifier ID (A) is required in order to decode the data content that was encoded by ID (A), and the identifier ID (B) is required in order to decode the data content that was encoded by ID (B). In the third embodiment, in the case in which data is transferred from terminal A to terminal B, after data is decoded within terminal A based on ID (A), it is encoded within terminal A based on ID (B) and then the encoded data is transferred to terminal B. Because the data that has been encoded based on ID (B) can only be decoded at terminal B, even if the data was illegally copied during transfer, it is not easy to play it back, thereby providing protection of the data from illegal copying.

The data compression/expansion section 707 compresses data and expands compressed data. To improve transfer efficiency, data is transferred in a compressed state. The data is, therefore, compressed before transfer and must be expanded after receipt. The playback section 708 performs playback of such data as sound. The played back sound and the like is output to the outside via the output terminal 709. The control section 710 performs control of the above-noted elements.

FIG. 17A and FIG. 17B are block diagrams that show the concept of the fourth embodiment of the present invention. It differs from the system of the third embodiment in that it uses a communication circuit 64 in place of a communication satellite, and in that it uses a personal computer (PC) 61 as a client, and Web server 61B, in place of a store-based terminal. First, that is, as shown in FIG. 17A, the sending-side portable terminal 60 receives data content from the content center 63, via the personal computer 61, and transfers electronic money to the billing center 62 in accordance with the price of the data content. Then, as shown in FIG. 17B, the data content is sent from the sending-side portable terminal 60 to the receiving-side portable terminal 66, without the intervention of the personal computer 61, for example. The receiving-side portable terminal 66 pays electronic money from the electronic wallet without transfer, and sends an electronic money information to the sending-side portable terminal 60. In addition, the history of the paid electronic money information may be recorded in the receiving-side portable terminal 66. Similar to the case of the third embodiment, the sending-side portable terminal 60 and the receiving-side portable terminal 66 both have both sending and receiving functions, and are the same, in terms of hardware.

Figure 19A:
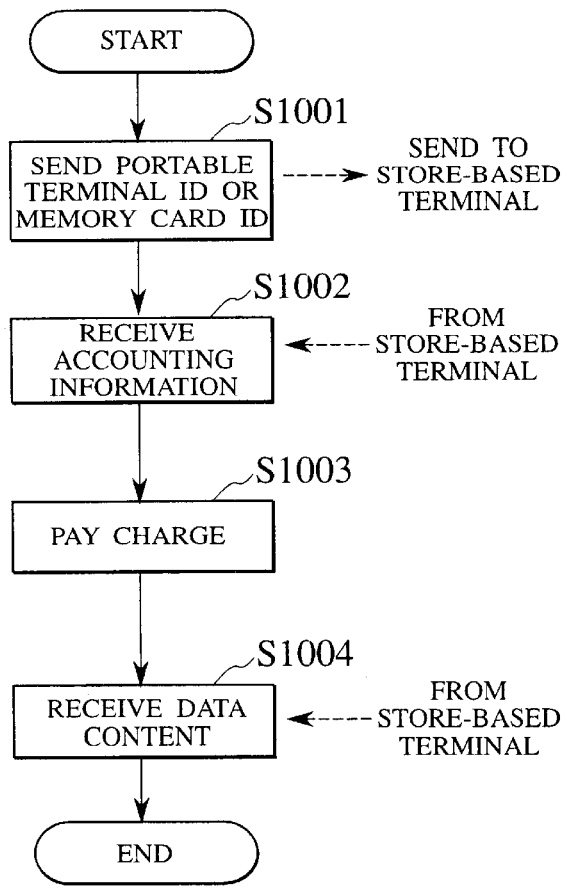
FIG. 19 is a flowchart that shows the flow of processing in the user portable terminal in the fifth embodiment of the present invention.
Figure 19B:
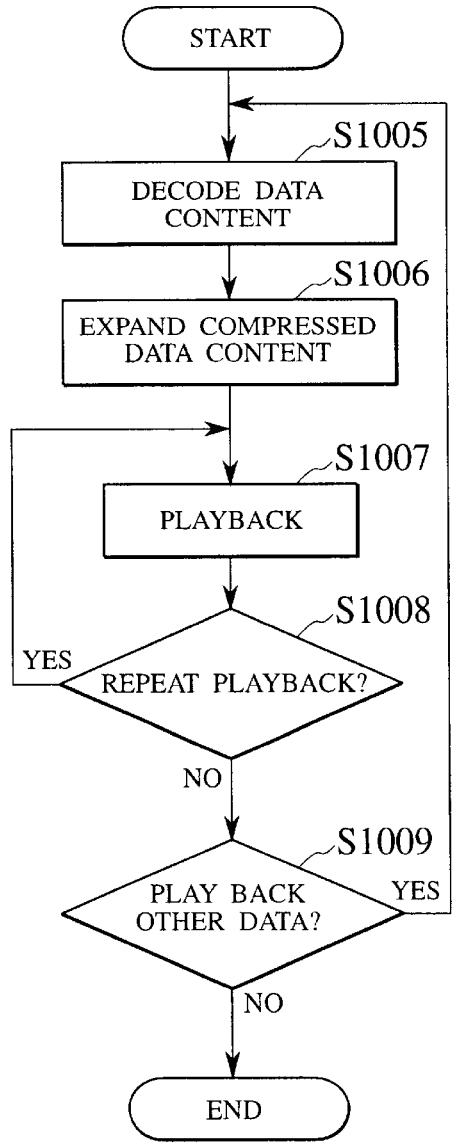

Next, the fifth embodiment of the present invention will be described, referring to FIG. 18 through FIG. 22. The fifth embodiment is a variation of the first embodiment. Because the system configuration is similar to that shown in FIG. 1, overlapping elements will not be described. FIG. 18 shows a simplified view of the flow of data in the fifth embodiment. In FIG. 18, parts that are the same as shown in FIG. 2 are assigned the same reference numerals, and will not be explicitly described herein. In this embodiment, a portable terminal ID or memory card ID 70 is sent from the portable terminal to the content center via the store-based terminal, without passing through the billing center. The portable terminal ID or and data content ID is sent from the store-based terminal to the content center, without passing through the billing center. The billing information is sent from the content center, via the store-based terminal, to the portable terminal. Because the electronic money 74 is of the prepaid card type, money is not sent, the amount on the prepaid card being merely reduced. After billing, the billing information is sent from the content center to the billing center as well. FIG. 19A and FIG. 19B are flowcharts that show the flow of processing in a user portable terminal in the fifth embodiment. In FIG. 19A and FIG. 19B, elements that are the same as in FIG. 3A and FIG. 3B have been assigned the same reference numerals, and will not be explicitly described herein. In this embodiment, because the electronic money is of the prepaid card type, the payment of the charge is made by reducing the amount on the prepaid card, there being no direct payment made to the store-based terminal (step 1003).

FIG. 20 is a flowchart that shows the flow of processing in a store-based terminal in the fifth embodiment. In FIG. 20, elements that are the same as shown in FIG. 4 have been assigned the same reference numerals and will not be explicitly described herein. In this embodiment, the portable terminal ID or memory card ID, the store-based terminal ID and data content ID are sent to the content center (step 1104). A transmission enabling signal is received from the content center (Yes result in step 1105), and if billing information is received (step 1106), billing information is sent to the portable terminal (step 1107). After billing to the portable terminal, the billing information is sent also the billing center (step 1108).

Figure 22:
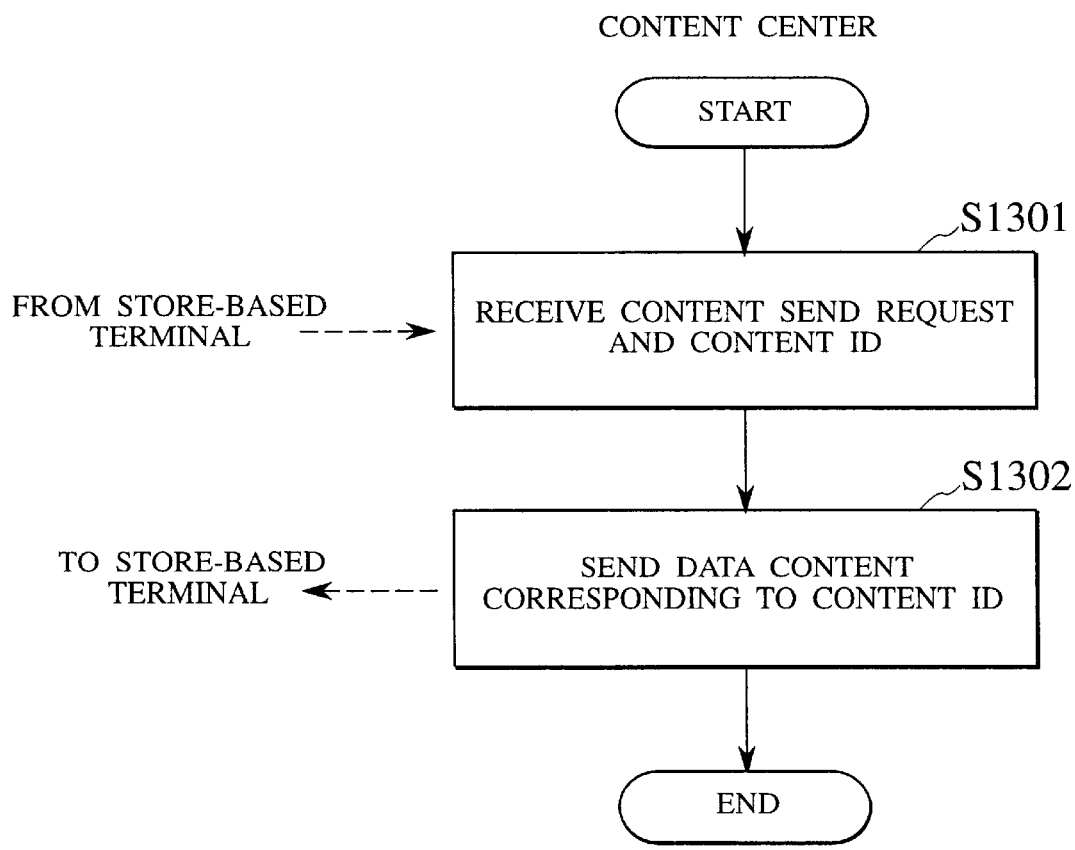
FIG. 22 is a flowchart that shows the flow of processing in the content center of the fifth embodiment of the present invention.

FIG. 21 is a flowchart that shows the flow of processing in the content center in the fifth embodiment. Because the content of the processing shown in FIG. 21 is similar to that of FIG. 5, similar parts are assigned the same reference numerals and will not be explicitly described herein. Whereas in FIG. 5 processing was performed in the billing center, in the fifth embodiment this processing is performed at the content center. The content center, similar to the case of the first embodiment, performs processing as shown in FIG. 22. Because the processing shown in FIG. 22 is similar to that of FIG. 6, corresponding elements are assigned the same reference numerals, and will not be explicitly described herein.

Figure 23:
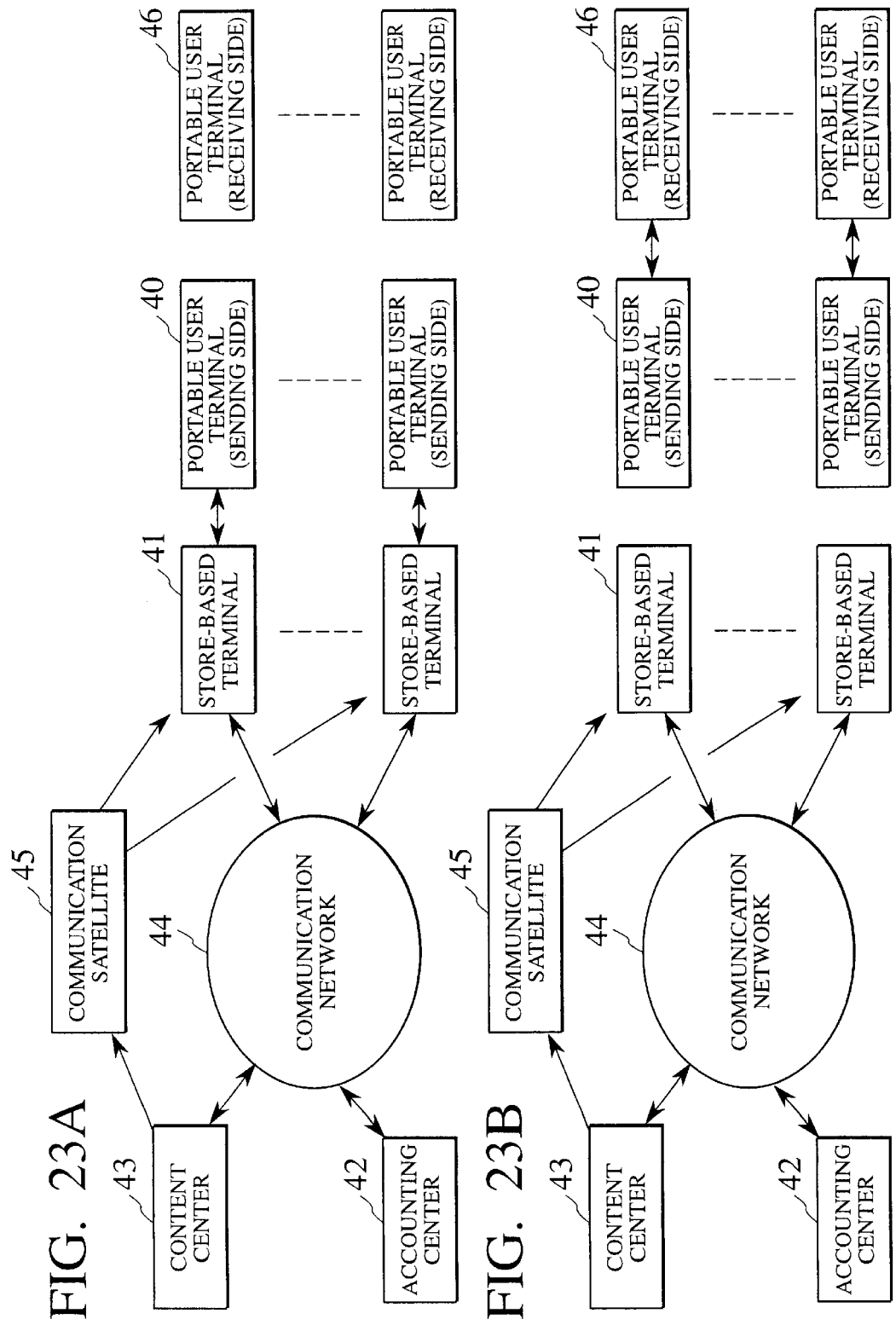
FIGS. 23A and 23B are block diagrams that show the overall system concept in performing transmission and reception of data having a structure as used by the present invention.

The sixth embodiment is described below. FIG. 23A and FIG. 23B are block diagrams which show the overall system concept in performing transmission and reception of data having a structure as used by the present invention. The system in this case is formed by a user portable terminal 40 (sending side), a store-based terminal 41, a billing center 42, a content center 43, a communication circuit 44, a communication satellite 45, and a user portable terminal (receiving side) 46.

The portable terminals 40 and 46 each have a unique ID code (this being hereinafter referred to as a player code). Each data content has a unique identification code (hereinafter referred to as a content ID). The portable terminal 40 makes a request to the store-based terminal to send data content. When this is done, the portable terminal 40 sends the content ID and the player ID.

Each store-based terminal 41 also has a unique identification code (hereinafter referred to as a business ID). A store-based terminal 41 which has received a request to sent data content notifies the billing center 42 and the content center 43 that it has received a request to send data content from a portable terminal 40.

Notification is given to the billing center 42 of the content ID, the player ID, and the business ID. The billing center 42 refers to a priorly prepared price table and sends a request to send the data content price corresponding to the data content ID to the communication circuit 44 and the store-based terminal 41.

Upon receiving a request to send the price of the data content, the portable terminal 40 sends electronic money as the data content price to the billing center 42, via the communication circuit 44. As electronic money, it is possible to use an IC chip, onto which a value of money is stored, for example Mondex or VISA Cash, which is then passed through an IC card reader, or an electronic wallet, such as an NTT flexible electronic ticket, can also be used.

After receiving the prescribed electronic money, the billing center 42 indicates this to the content center 43. Upon receipt of notification of receipt of electronic money from the billing center 42, the content center 43 sends the data content to the portable terminal 40, via the communication satellite 45 and the store-based terminal 41.

After receipt of the data content by the portable terminal 40 via the store-based terminal 41, the portable terminal 40 is removed form the store-based terminal 41, enabling it to be carried about freely, and used to play back the received data content (for example, music data) for the purpose of user enjoyment anytime and anywhere.

As shown in FIG. 23B, after receiving the data content, the portable terminal (sending side) 40 is removed from the store-based terminal 41, enabling it to be freely carried about, and used to transfer the data content stored in the portable terminal (sending side) 40 to another portable terminal (receiving side) 46, in the case of which copying the store-based terminal 41 does not play a role. That is, it is possible to perform transfer of data content between a portable terminal (sending side) 40 and a portable terminal (receiving side) 46 without the need for a store-based terminal 41. Even in the case in which data content copying is done between portable terminals, a charge is made, electronic money corresponding to the price of the data content being sent from the portable terminal (receiving side) 46 to the portable terminal (sending side) 40. When copying of data content is done between portable terminals, the portable terminal ID of the portable terminal (receiving side) 46 and the data content ID for the data content that was copied are sent as transfer history information to the portable terminal (sending side) 40. At a later date, when the portable terminal (sending side) 40 is connected along with electronic money to a store-based terminal 41, this copying history is read into the store-based terminal 41 from the portable terminal 40 and sent to the billing center 42. By doing this, it is possible to collect information with regard to what contents were acquired by what portable terminal, and to collect electronic money in the billing center 42.

The sending side portable terminal 40 and the receiving side portable terminal 46 are distinguished as "receiving" and "sending" sides merely as a convenience. In reality, both have both receiving and sending functions, and are the same in terms of hardware. In these expressions, the "sending side" refers to the portable terminal that is sending data during a transfer of data content between portable terminals, and the "receiving side" refers to the portable terminal that receives the sent data content during a transfer between portable terminals.

Figure 24:
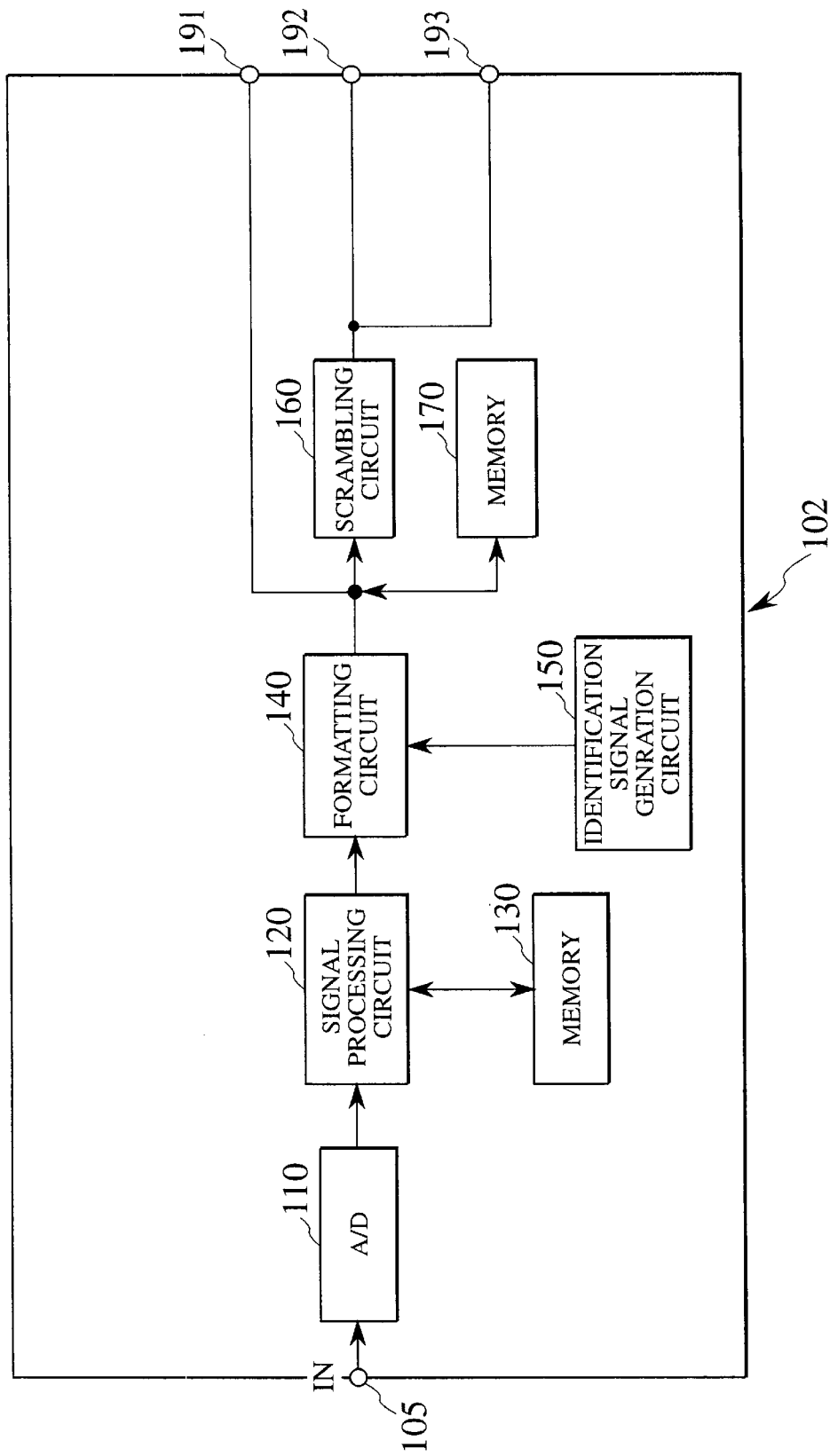
FIG. 24 is a block diagram that shows the details of the transmission-side encoding apparatus.

FIG. 24 is a block diagram that shows the configuration of a sending-side encoding apparatus. The encoding apparatus 102 is installed in the content center 43 (FIG. 23), and is used to encode send data to a prescribed format. The encoding apparatus 102 is made up of an input terminal 105, an A/D converter 110, a signal processing circuit 120, a memory 130, a formatting circuit 140, an identification signal generation circuit 150, a scrambling circuit 160, a memory 170, and output terminals 191 to 193.

A plurality of channels of music signal are supplied to the A/D converter 110 via the input terminal 105, these being converted to a digital signal by sampling at a prescribed sampling frequency (for example a sampling frequency of 44.1 kHz) and with a prescribed number of quantizing levels (for example, 20-bit quantizing).

The digital signal that is output from the A/D converter 110 is input to the signal processing circuit 120. At the signal processing circuit 120, signal processing such as mixing (number of channels adjustment) and compression are done with respect to the input signal, in combination with the memory 130, which is for both buffering and signal processing parameters.

More specifically, the signal processing parameters are the attack time, release time, and compression ratio for compressor and limiter signal processing, the center frequency, level, and Q for each equalizer in parametric equalizer signal processing, or the attenuation levels of the attenuator in each channel. The compressor/limiter adjusts the dynamic range of a music signal to an appropriate range, enabling prevention of overflow. A parametric equalizer boosts and cuts the frequency bands of a music signal, thereby adjusting the frequency characteristics of the signal, this enabling the emphasis or attenuation of, for example, the low-frequency end of the signal. Number of channels adjustment is mixing for the purpose of converting 24 or 48 channels to 2 channels.

The data compression method used in the present invention can be selected from such technologies as TwinVQ™, AAC (Advanced Audio Coding), MPEG (Motion Picture Experts Group) Layer1, MPEG Layer3, and ATRAC (Adaptive Transform Acoustic Coding. The processed signal is supplied to the formatting circuit 140.

At the formatting circuit 140, music data is arranged in accordance with an identification signal from the identification signal generation circuit 150 and a prescribed recording format. This identification signal is an information signal such as the content ID, business ID, a title ID, a transfer level flag, and appended information that is stored in the content header area 260 (FIG. 25, (a)), and information signal such as the number of data, which is stored in the common header area 200 (FIG. 25, (a)).

Figure 25:
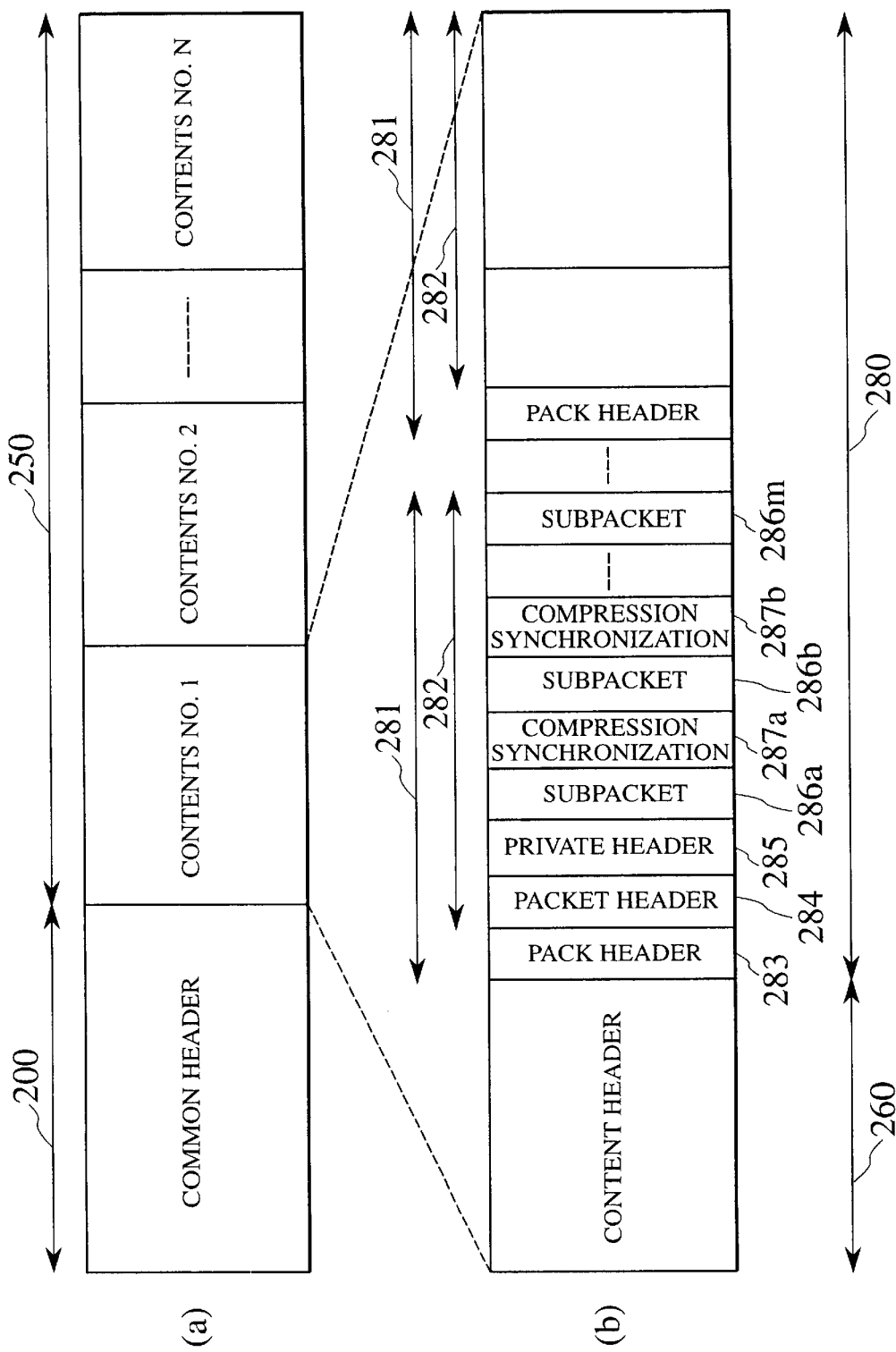
FIG. 25 is a drawing that shows the data structure in an embodiment of the present invention.

The above-noted prescribed format refers to the data formats that are shown in FIG. 25 at (a) and (b). Sound or other data that is arranged in the prescribed format is supplied directly to a monitor output terminal 19, for output to a monitor (not shown in the drawing), for the purpose of monitoring the data. Sound data arranged in the prescribed format is temporarily stored in the save memory 170 as well. Data that is stored in the memory 170 is scrambled by the scrambling circuit 160, after which it is supplied to the output terminal 19, from which it is sent to the communication satellite transmitter (not shown in the drawing).

The data that is scrambled by the scrambling circuit 160 is supplied to the output terminal 193, and it sent to the Internet. To increase the difficulty of descrambling scrambled data that is distributed to the Internet, a second scrambling circuit (not shown in the drawing) can be provided between the scrambling circuit 160 and the output terminal 193, in order to achieve double scrambling. The process of scrambling is an encryption process whereby plain text is scrambled in processing units of, for example, 64 bits. Alternatively, the process of scrambling means a process of exclusive OR by using an encryption key.

FIG. 25 is a drawing that shows the data structure used in an embodiment of the present invention. As shown in FIG.

25, (a), this data is made up by a common header area 200 and a content area 250.

The common header area 200 is in turn made up of a player ID area, a scramble ID area, a number of data contents area, a used area information area, a transfer pre-paid area, and a transfer history area.

The player ID is a player ID area is used to store the player ID that is used in code processing. This player ID is first sent from the data transfer destination to the source of the data transfer. That is, in the case in which data is to be received by the portable terminal 40 from the store-based terminal 41, the player ID of the portable terminal 40 is sent from the portable terminal 40 to the store-based terminal 41. In the case in which the portable terminal 46 is to receive data, the player ID of the portable terminal 46 is sent from the portable terminal 46 to the portable terminal 40.

The scramble ID area is used to store the scramble ID that is the encoded key and the like that is used in encoding. The scramble ID is the decode key that is encoded by the player ID. The key before encoding is issued by the content supplier at the time of encoding.

The number of data contents area stores the overall number of data that are stored in the contents area. The used area information area has stored in it a plurality of names of geographical area into which the country is divided. In the case of Japan, these are areas such as Kanto, Kansai, Kyushu, and Hokkaido. In the case of the world, country names are used. The transfer prepaid area has stored in it sales information (price) of the data content.

The transfer history area is formed by a content ID (CID) area, a number of transfers area, and a transfer date and time area. The number of transfers refers to the number of data transfers from the portable terminal 40, which is the transmitting side, to the portable terminal 46, which is the receiving side, and the transfer date and time is the date and time when a transfer was performed. A used area may be stored in the transfer history area.

FIG. 25, (b) shows the detail structure of data in the contents area 250. As shown in this drawing, the contents area 250 is made up of a content header area 260 and a content data area 280.

The content header area 260 is made up of a content ID area, a business ID area, a title information area, a player ID area, a transfer level flag area, and an appended information area.

The business ID area is used to store a business ID, this being an identification code that is assigned to each store-based terminal that receives distributed data. The title information area is used to store title information, which is a copyright code (ISRC code) that is unique to a particular song. The transfer label flag area is used to store a transfer level flag, which indicates the type of transfer. The appended information area is sued to store appended information, such as a TOC (table of contents). The TOC is a table of contents that includes such information address information for cueing a song, and the length of a song. The TOC can be stored in the common header 200, or stored in both the common header 200 and the content header 260.

The content header area 280 is used to store data content that is scrambled according to the player ID. The content data area 280 is made up of a plurality of packs 281. Each pack 281 is made up of a pack header 283 and the packet 282. Each packet 282 is made up of a packet header 284, a private header 285, and user data. The user data is made up of a subpacket 286a, a compression synchronization signal 287a, a supacket 286b, a compression synchronization signal 287b, and so on, up to a subpacket 286m, the compression synchronization signals being provided to establish synchronization with subsequent subpackets. In addition, a memory card ID may be used instead of the player ID.

Figure 26:
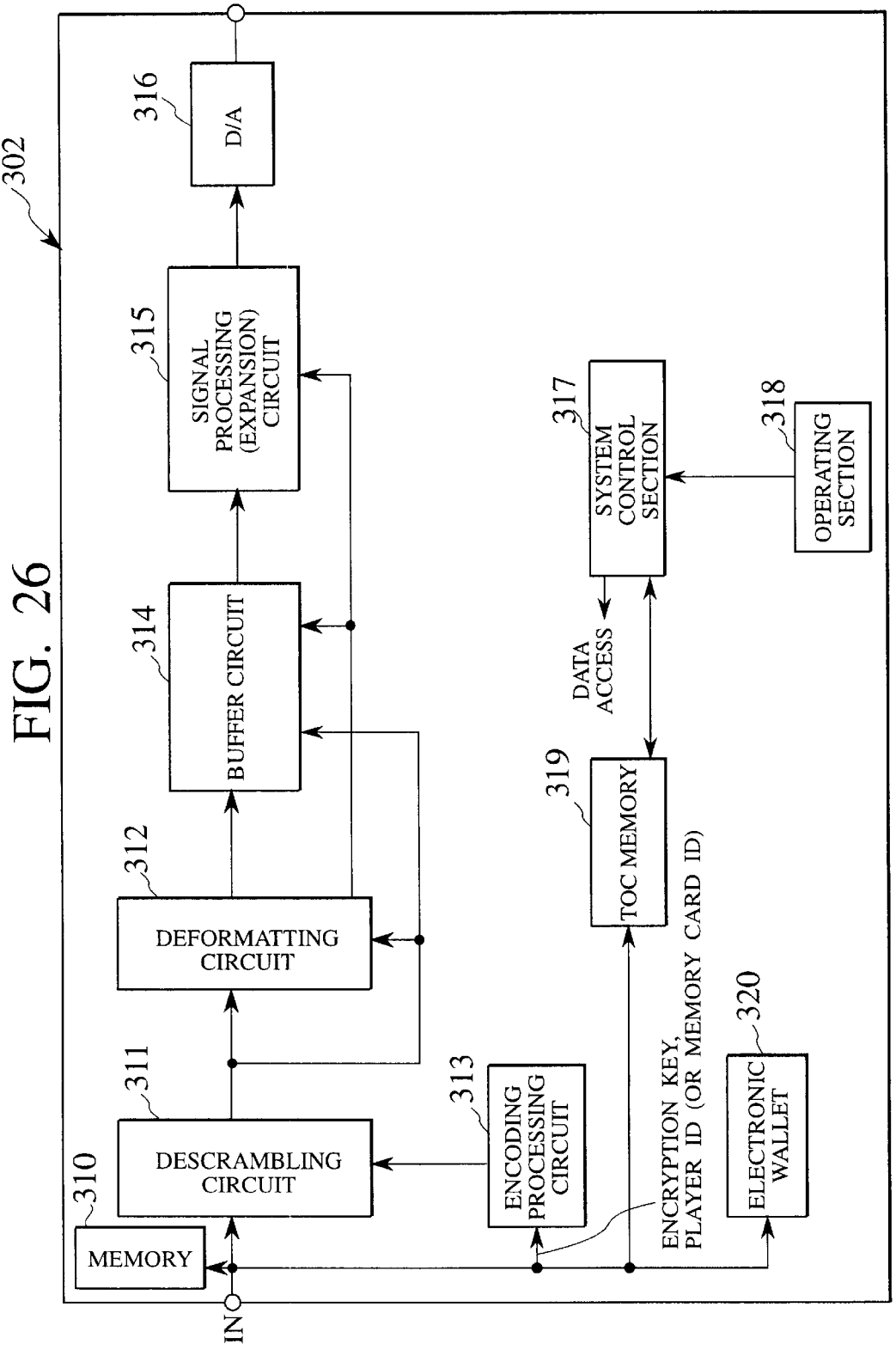
FIG. 26 is a block diagram that shows the data playback means within a portable terminal according to the present invention.

FIG. 26 is a block diagram that shows the data playback means within a portable terminal, in which the reference numeral 302 denotes the portable terminal. Data which is received from a store-based terminal 41, for example, is recorded in a memory 310 and descrambled by a descrambling circuit 311. An encoding circuit 313 generates the key required for descrambling, and supplies this key to the descrambling circuit 311. The memory card ID is recorded in the memory 310. The memory card ID cannot be rewrite.

Descrambled data is supplied to a deformatting circuit 312, which deformats the data. Supply to the deformatting circuit 312 is performed at each system clock reference (SCR). The SCR (6 bytes) is stored at the fifth byte of the pack header 283 (14 bytes). Deformatting refers to processing that separates each data content from the common header. Electronic money that corresponds to the price of the received data content is paid from the electronic wallet 320.

As shown in FIG. 27, deformatted data is sent to a buffer circuit 314 for each SCR. The data that is supplied to the buffer circuit 314 is read out for each decoding time stamp (DTS) that is recorded in the packet header 284, and transferred to a signal processing circuit 315. Note, however, that because the DTS is coded for only the leading access unit, for the second and subsequent access units, transfer is made from the buffer circuit 314 to the signal processing circuit 315, in accordance with the information within the signal processing circuit 315. When this is done, detailed information with regard to the compression method, which is stored in the private header 285 and the compression synchronization signal 287 is referenced, so that expansion is performed in accordance with the individual methods of compression. Expanded data is extracted so as to achieve a fixed sampling period, by a presentation time stamp (PTS) that is recorded in the packet header 284, and input to a D/A converter 316. The data input to the D/A converter 316 is converted to an analog signal and output therefrom.

By storing the TOC into a TOC memory 319, it is possible to perform a high-speed search of contents. The TOC is provided so that, when a user specifies a sequence of contents starting at the first and running to the Nth content, the corresponding locations in the TOC are referenced, the addresses, sampling frequencies, number of channels, and playback time thereof being read and access being started, at which point the sampling frequency and number of channels settings are made, and the playback time is displayed. Because there is no need to scan the content header, access is facilitated and there is no waiting time, enabling effective use in making a high-speed scan (introduction scan).

It will be understood that the present invention is not limited to the foregoing embodiments, and can take the form of numerous variations, within the scope of the essence thereof.

In the embodiments described above, the data content has been encoded with the portable terminal ID or memory card ID. However, the portable terminal may have a public key, and the data content may be encoded with the public key at least before transferring the data content, and then the public key may be encoded and decoded with the portable terminal ID or memory card ID at each data distribution.

In addition, for example, output terminals of the portable terminal of the embodiments described above may be connected to the interfaces of an audio unit with speakers so that the portable terminal may be used in combination with these units.

What is claimed is:

1. A data distribution system comprising:

a portable user terminal for sending a portable terminal ID and electronic money and receiving data content;

a store-based terminal for receiving a portable terminal ID and electronic money from the portable user terminal and sending the received portable terminal ID and the electronic money with a content ID and a store-based terminal ID;

a billing center for receiving the content ID, the portable terminal ID, the store-based terminal ID and the electronic money from the stored-based terminal; and a content center for receiving the portable terminal ID and store-based terminal ID, and sending the data content, via the store-based terminal, to the portable user terminal, wherein the portable user terminal has means for sending the receiving data content to another portable user terminal by paying either one's electronic money and means for recording a transfer history when sending the receiving data content to another portable user terminal, wherein the store-based terminal has means for receiving the, transfer history when the portable user terminal is connected to the store-based terminal.

2. A data distribution method comprising the steps of:

sending a portable terminal ID from a portable terminal to a store-based terminal;

sending the portable terminal ID, a content ID, and a store-based terminal ID from the portable terminal to a billing center;

sending billing information corresponding to the content ID from the billing center, via the store-based terminal, to the portable terminal;

sending electronic money corresponding to the billing information from the portable terminal, via the store-based terminal, to the billing center;

sending a send request signal for the data content corresponding to the content ID from the store-based terminal to the content center;

distributing the data content from the content center, via the store-based terminal, to the portable terminal;

sending the receiving data content from the portable user terminal to another portable user terminal;

paying either one's electronic money when sending the receiving data content from the portable user terminal to another portable user terminal;

recording a transfer history when sending the receiving data content to another portable user terminal; and receiving the transfer history by the store-based terminal when either of the portable user terminal is connected to the store-based terminal.

3. A portable terminal with receiving capability comprising:

a control section for performing overall operational control;

a data transmission interface for performing transfer of data with the outside;

a storage section for performing writing and reading of the data, the storage section for storing the data encoded with a portable terminal ID and compressed;

a data expansion section for expanding the compressed data;

a decoding section for decoding the encoded data;

a playback section for playing back the expanded and decoded data;

an electronic wallet section for performing receipt and payment of electronic money, the electronic wallet for paying a charge for the data; and an internal bus for performing data transfer between the control section, the interface, the storage section, the data expansion section, the decoding section, the playback section, and the electronic wallet section, wherein the portable user terminal has means for sending the receiving data content to another portable user terminal by paying either one's electronic money and means for recording a transfer history when sending the receiving data content to another portable user terminal, wherein the store-based terminal has means for receiving the transfer history when the portable user terminal is connected to the store-based terminal.

4. A data distribution system comprising:

a first portable terminal for sending a content ID and a first portable terminal ID, receiving data content corresponding to the sent content ID, and paying electronic money;

a second portable terminal for receiving the data content, the content ID and the first portable terminal ID from the first portable terminal, and sending the content ID, the first portable terminal ID, an electronic money information and a second portable terminal ID;

a store-based terminal for receiving the content ID, the first portable terminal ID, the second portable terminal ID, and the electronic money information from the second portable terminal, and sending the content ID, the first portable terminal ID, the second portable terminal ID, a store-based terminal ID and the electronic money information; and a billing center for receiving the content ID, the first portable terminal ID, the second portable terminal ID, the store-based terminal ID, electronic money and the electronic money information, wherein the first or second portable terminal has means for recording a transfer history when sending or receiving the data content to or from another portable terminal; and wherein the store-based terminal has means for receiving the transfer history when the portable user terminal is connected to the store-based terminal.

5. A data distribution method comprising the steps of:

sending a content ID and a first portable terminal ID from a first portable terminal to a second portable terminal;

sending billing information that corresponds to the content ID from the second portable terminal to the first portable terminal;

sending electronic money that corresponds to the billing information from the first portable terminal to the second portable terminal;

distributing data content that corresponds to the content ID from the second portable terminal to the first portable terminal;

sending the content ID, the first portable terminal ID, the electronic money, and the second portable terminal ID from the second portable terminal to a store-based terminal, and sending the content ID, the first portable terminal ID, the second portable terminal ID, the electronic money, and a store-based terminal ID from the store-based terminal to a billing center, wherein the first or second portable terminal records a transfer history when sending or receiving the data content to or from another portable terminal; and wherein the store-based terminal receives the transfer history when the portable user terminal is connected to the store-based terminal.

6. A portable terminal capable of data transmission and reception, comprising:

a control section for controlling overall operation;

a data transmission interface for performing transfer of data with the outside;

a storage section for performing writing and reading of the data;

a compression/expansion section for performing compression and expansion of the data;

an encoding/decoding section for encoding the data and decoding the encoded data;

a playback section for playing back the expanded and decoded data;

an electronic wallet section for performing receipt and payment of electronic money; and an internal bus for performing data transfer between the control section, the data transmission interface, the storage section, the compression/expansion section, the encoding/decoding section, the playback section, and the electronic wallet section, wherein data is received via the data transmission transfer section, the electronic wallet section paying electronic money as a price for the data, this data being encoded with a first encoding key, compressed, and stored in the storage section, the encoded, compressed data being expanded by the compression/expansion section and decoded by the encoding/decoding section with the first encoding key, and being further encoded with a second encoding key, and compressed by the compression/expansion section to be sent through the data transmission interface.

7. A data distribution system comprising:

a portable user terminal for sending a portable terminal ID or memory card ID, receiving data content, and paying electronic money;

a store-based terminal or client for receiving a portable terminal ID or memory card ID from a portable terminal and sending the received portable terminal ID or memory card ID, a content ID and a store-based terminal ID; and a content center for receiving from a store-based terminal or client the portable terminal ID or memory card ID, the content ID and the store-based terminal ID and distributing data content to the portable terminal via the store-based terminal or client, wherein the portable user terminal has means for sending the receiving data content to another portable user terminal by paying either one's electronic money and means for recording a transfer history when sending the receiving data content to another portable user terminal, wherein the store-based terminal has means for receiving the transfer history when the portable user terminal is connected to the store-based terminal or client.

8. A data distribution system method comprising the steps of:

sending a portable terminal ID or memory card ID from a portable terminal to a store-based terminal or a client;

sending at least a content ID and a store-based terminal ID from a store-based terminal or a client to a content center;

sending a send request signal for the data content corresponding to the content ID from the store-based terminal or client to a content center;

a step of sending the data content from the content center to the portable terminal, via the store-based terminal or client, sending the receiving data content from the portable user terminal to another Portable user terminal;

paying either one's electric money when sending the receiving data content from the portable user terminal to another portable user terminal;

recording a transfer history when sending the receiving data, content to another portable user terminal; and receiving the transfer history by the store-based terminal when either of the portable user terminal is connected to the store-based terminal or client.

9. A portable terminal capable of data transmission and reception, comprising:

a data transfer interface for performing data transfer of decoded data content and a decode key with the outside;

a storage section for storing a decoding key which was obtained by encoding a public key with a portable terminal ID or memory card ID;

a decoding section for decoding the data content with the decode key which was decoded with a portable terminal ID or memory card ID;

a playback section for playing back the data content decoded by the decoding section; and an electronic wallet section for paying electronic money as payment for the data content, wherein the portable terminal has means for sending the received data content and a decode key different from one from outside to another portable user terminal by paying either one's electronic money.

10. A data distribution system comprising:

a first portable terminal for sending a content ID and a first portable terminal ID or memory card ID, receiving data content corresponding to the content ID, and paying electronic money;

a second portable terminal to which the data content is distributed from the first portable terminal, the second portable terminal sending the content ID, the first portable terminal ID, electronic money information and a second portable terminal ID;

a store-based terminal or a client for sending the content ID, the first portable terminal ID, the second portable terminal ID or memory card ID, the electronic money information and a store-based terminal ID; and a billing center for receiving the content ID, the first portable terminal ID, the second portable terminal ID, the store-based terminal ID or client ID and the electronic money information, wherein the first portable user terminal has means for sending the receiving data content to the second portable user terminal by paving either one's electronic money and means for recording a transfer history when sending the receiving data content to another portable user terminal, wherein the store-based terminal or client has means for receiving the transfer history when the first or second portable user terminal is connected to the store-based terminal.

11. A data distribution method comprising the steps of:

sending a content ID and a first portable terminal ID or memory card ID from a first portable terminal to a second portable terminal;

sending billing information corresponding to the content ID from the second portable terminal to a first portable terminal;

paying electronic money corresponding to the billing information at either the first portable terminal or the second portable terminal;

distributing data content corresponding to the content ID from the second portable terminal to the first portable terminal;

sending the content ID, the first portable terminal ID or memory card ID, an electronic money information, and the second portable terminal ID or memory card ID from the second portable terminal to a store-based terminal or a client; and sending the content ID, the first portable terminal ID or memory card ID, the second portable terminal ID or memory card ID, the electronic money information and a store-based terminal ID from the store-based terminal or client to a billing centers wherein the first or second portable user terminal has means for recording a transfer history when sending the receiving data content to another portable user terminal, wherein the store-based terminal or client has means for receiving the transfer history when the first or second portable user terminal is connected to the store-based terminal.

12. A data distribution method according to claim 11, wherein the store-based terminal or client, comprises:

a first section for receiving a portable terminal ID or memory card ID from a user portable terminal which pays electronic money for a data content; and a second section for transmitting at least a content ID and a store-based terminal ID to a content center;

wherein the first section receives the data content corresponding to the content ID from the content center and the second section sends the received content data to the user portable terminal.

13. A data distribution system according to claim 1, wherein the content center comprising an encoding apparatus, comprising:

signal compression means for compressing data content;

identification signal generation means for generating common control information that is common to the data contents and individual control information for each data content;

formatting means for recording the common control information in the common header area, recording the individual control information in each of the data content header areas and recording each data content in each data content area; and scrambling means for scrambling the data content with a prescribed key.

14. A data distribution system according to claim 13, wherein the content center comprising a decoding apparatus that decodes the data content encoded by the encoding apparatus, the decoding apparatus comprising:

descrambling means for descrambling the data content with the prescribed key;

deformatting means for separating the descrambled data content from the common control information; and signal expansion means for expanding the separated data content.

15. A data distribution system according to claim 1, wherein the content center comprising an encoding apparatus, comprising:

signal compression means for compressing data content;

identification signal generation means for generating common control information that is common to the data contents and individual control information for each data content;

formatting means for recording the common control information in the common header area, recording the individual control information in each of the data content header areas and recording each data content in each data content area; and scrambling means for scrambling the data content with a key that is unique to the receiving means that receives the data content.

16. A data distribution system according to claim 15, wherein the content center comprising a decoding apparatus that decodes the data content encoded by the encoding apparatus, the decoding apparatus comprising:

descrambling means for descrambling the data content with the key that is unique to the receiving means used to receive the data content;

deformatting means for separating the descrambled data content from the common control information; and signal expansion means for expanding the separated data content.

17. A data distribution system according to claim 1, wherein the data content comprising a data format comprising:

a common header area, in which control information that is common to a plurality of data contents is recorded; and a content area, in which the plurality of data contents are recorded, the content area having a content header area, into which is recorded control information that is unique to each of the data contents, and a content data area, into which the actual data contents are recorded, a content identification code that is unique to each data content being recorded in the content header area, and each of the data contents that is recorded in the content data area being encoded with the content identification code as a prescribed key.

18. A data distribution system according to claim 17, wherein the encryption key is encoded with a receiving means identification code that is unique to a receiving means that receives the data content, the encoded encryption key being recorded in the common header area.

* * * * *